US008526307B2

(12) United States Patent
Jeong

(10) Patent No.: US 8,526,307 B2
(45) Date of Patent: Sep. 3, 2013

(54) PROPORTIONAL-FAIR RADIO RESOURCE MANAGEMENT

(75) Inventor: Moo Ryong Jeong, Albany, CA (US)

(73) Assignee: NTT DoCoMo, Inc., Tokyo (JP)

( * ) Notice: Subject to any disclaimer, the term of this patent is extended or adjusted under 35 U.S.C. 154(b) by 162 days.

(21) Appl. No.: 13/180,350

(22) Filed: Jul. 11, 2011

(65) Prior Publication Data
US 2012/0224558 A1 Sep. 6, 2012

Related U.S. Application Data

(60) Provisional application No. 61/449,466, filed on Mar. 4, 2011.

(51) Int. Cl.
H04W 4/00 (2009.01)
H04J 3/22 (2006.01)

(52) U.S. Cl.
USPC ........ 370/230; 370/328; 370/468; 455/452.2; 455/453

(58) Field of Classification Search
USPC ................ 370/229–235, 238, 329–334, 431, 370/468; 455/450–453
See application file for complete search history.

(56) References Cited

U.S. PATENT DOCUMENTS

| 2007/0070894 | A1* | 3/2007 | Wang et al. | 370/230 |
|---|---|---|---|---|
| 2007/0248048 | A1* | 10/2007 | Zhu et al. | 370/329 |
| 2007/0248178 | A1* | 10/2007 | Zhu et al. | 375/260 |
| 2010/0091798 | A1* | 4/2010 | Bhushan et al. | 370/474 |
| 2012/0020209 | A1* | 1/2012 | Ghosh et al. | 370/230 |
| 2013/0107726 | A1* | 5/2013 | Hughes et al. | 370/252 |

* cited by examiner

Primary Examiner — Kerri Rose
(74) Attorney, Agent, or Firm — Haynes and Boone, LLP

(57) ABSTRACT

In one embodiment, the unit share data rates for a plurality of mobile stations are determined with regard to two resource groups. A differentiation factor for each mobile station is formed from a ratio of its unit share data rates. The resulting differentiation factors are sorted and classified into two groups according to a proportional fair border determining function. A first one of the resource groups is allocated to the mobile stations corresponding to a first one of the differentiation factor groups. Similarly, a second one of the resource groups is allocated to the mobile stations corresponding to a remaining second one of the differentiation factor groups.

14 Claims, 7 Drawing Sheets

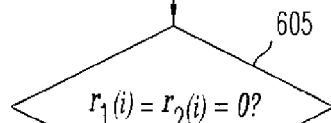
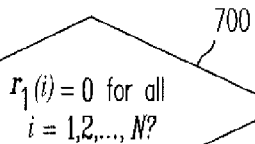
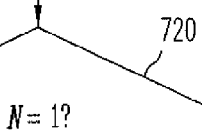

PROPORTIONAL-FAIR RADIO RESOURCE MANAGEMENT

RELATED APPLICATION

This application claims the benefit of U.S. Provisional Application No. 61/449,466, filed Mar. 4, 2011.

TECHNICAL FIELD

The present invention relates to wireless network resource management, and more particularly to a proportional-fair radio resource management technique.

BACKGROUND

Many challenging wireless network management issues arise with regard to the allocation of two available resource groups. For example, the component carrier (CC) assignment problem in a carrier aggregated network, the resource partition (RP) assignment problem in an interference coordinated network, and the handoff (or cell association) decision problem all typically involve the partitioning or allocation of two resource groups. The definition of a resource group depends upon the network circumstances—for example, a resource group may be a single component carrier (or a set of CCs) in the component carrier assignment problem, or a single resource partition (or a set of RPs) in the resource partition assignment problem, or the radio resource of a single cell in the handoff decision problem.

Regardless of the particular type of resource group being allocated, the allocation depends upon the goals of the network designer. For example, one can design a network so that system capacity is maximized. In that regard, suppose a high quality resource group is being allocated along with a low quality resource group. If there is single wireless terminal in a cell, a trivial solution to allocation is to let the wireless terminal use both resource groups. If there is more than one user, the problem is no longer trivial due to the conflict between system capacity and fairness. For example, the radio quality for a terminal in the cell core is likely better than that for a terminal in the cell edge. Assigning both the high and low quality resource group to the cell core terminal, therefore, maximizes the system capacity. But such a solution makes maximizes unfairness because the edge terminal is not provided with any resource. Conversely, the network designer may stress fairness over system capacity. In such a scenario, one could evenly distribute the high quality and low quality resource groups to all terminals in the cell. If the resource groups are component carriers, however, the power consumption caused by turning on multiple CCs should be avoided (especially for the battery-powered terminals) as much as possible. Moreover, channel feedback and scheduling overhead accompanied by multiple CCs (or RPs) grows as the number of wireless terminals increases. Thus, system capacity would be significantly degraded in a totally fair design.

One can thus readily appreciate that it is a non-trivial problem to balance the competing needs of system capacity and fairness simultaneously. Thus there is a need in the art for improved resource group allocation techniques.

SUMMARY

In one embodiment, radio resource management is differentiated by the radio quality difference of two resource groups. First, the unit share rate achievable with a unit share of each of resource groups is determined for each wireless terminal. Alternative rate definitions may also be used. Each terminal would thus have a first unit share rate corresponding to a first resource group and a second unit share rate corresponding to a second resource group. Here, each terminal is required to have an above-zero rate at least at one of the two resource groups (if the rates of a terminal are zero in both of the groups, it is simply excluded from the resource allocation). If there is only one terminal satisfying the requirement, a trivial solution is to allocate all the resource groups with above-zero rate to the single terminal. If there are at least two terminals satisfying the above requirement, then a differentiation factor is determined for each terminal by computing the ratio of the two rates, for example, by computing the ratio of the first unit share rate divided by the second unit share rate. Alternative expressions can be used as discussed further below but the resulting differentiation factors should be calculated in a fashion that addresses the relative sizes of each resource group. Defining the bit rates per unit share of the resource group as discussed further herein conveniently accounts for the relative sizes of the resource groups. If the differentiation factors of the terminals are all zero or all infinity, then all terminals have zero rate in one resource group and (finite) non-zero rates in the other resource group. A trivial solution for such case is to allocate the resource of the resource group with non-zero rate evenly to the terminals. On the other hand if there is at least one terminal with a finite, non-zero differentiation factor, then for each of such terminals, the resource shares of the terminal at the first resource group and the second resource group are determined based on the differentiation factors of the terminal and the other terminals. A terminal is considered as associated with a resource group if the resource share of the terminal at the resource group is above zero.

The resource shares of terminals may be determined by sorting the differentiation factors for the terminals in either a non-decreasing or non-increasing order. It there are N such terminals being sorted, the terminals may be indexed with regard to this ordering according to an index k that ranges from 1 to N. Alternatively, the terminals may be indexed from an integer a to form a sorted group a, a+1, . . . , a+N−1. This alternative indexing is advantageous with regard to implementing the sorting algorithm in software in that it saves memory space for the resulting arrays. The following discussion will first address the case in which the index ranges from 1 to N followed by a discussion of the index ranging from a to a+N−1. There will thus be a total of four proportional fair alternatives in that each index alternative may be solved using either an increasing or decreasing sorting of the differentiation factors as set forth below in Table 1. The first two alternatives concern the indexing from 1 to N and are denoted herein as "algorithm 1" and "algorithm 2." Algorithm 1 addresses a descending sorting whereas algorithm 2 is directed to an ascending sorting of the differentiation factors. Algorithms 3 and 4 use an indexing from an integer a to an integer a+N−1. Algorithm 3 addresses a descending sorting whereas algorithm 4 is directed to an ascending order of the differentiation factors. It may be seen that algorithm 1 is just a special case of algorithm 3. Similarly, algorithm 2 is a special case of algorithm 4.

TABLE 1

| | | Sorting of d(k) | |
|---|---|---|---|
| | | Descending | Ascending |
| Indexing | k = 1, 2, . . . , N | Algorithm 1 | Algorithm 2 |
| | k = a, a + 1, . . . , a + N − 1 | Algorithm 3 | Algorithm 4 |

In each algorithm, a border determining function may be applied to the sorted differentiation factors to determine a border terminal index (defined with regard to an integer K). Equivalently, an inverse border determining function may be applied to the sorting index as compared to differentiation factors to determine the border terminal index. With regard to the ith sorting index, the ith differentiation factor may be denoted as d(i) such that the border determining function of the ith differentiation factor may be denoted as G(d(i)). The terminals may then be allocated to one resource group or the other depending upon their relationship to the border terminal index. Advantageously, only the border terminal can be allocated to both resource groups, which simplifies implementation. Accordingly, up to one terminal (that is, the border terminal) may associate with both resource groups while the other terminals associate with only one of the two resource groups. The radio resource of a resource group is allocated only to the terminals associated with the resource group. The distribution of the terminal throughputs according to the above resource allocation can be proved to be proportional-fair, which is known to provide a good trade-off between the system capacity and fairness.

Because most of the terminals (i.e. all terminals except for up to one terminal) are associated with only one resource group, overhead involved in the association and allocation of the resource groups is significantly reduced as compared to conventional schemes where terminals are associated with and allocated from both resource groups. If the quality of one resource group is better than that of the remaining resource group for all wireless terminals, then the differentiation factors are either all above one or below one depending on how the ratio for the differentiation factors is computed. The present invention provides a proportional fair resource allocation for such a scenario. Thus, while a strategy that simply selects a high-quality resource group for all wireless terminals wastes the other resource group in that no wireless terminal is allocated to the low-quality resource group, the present invention provides more efficient resource allocation.

When association is of primary interest, it can be determined alternatively without determining the resource group shares. To do so, first the differentiation factors of all the terminals may be sorted in a monotonically decreasing order. The sorted differentiation factors are then tested to find which of the following conditions is satisfied.

1. If there is $K \in \{1, \ldots, N-1\}$ such that $G(d(K+1)) \leq K \leq G(d(K))$
2. If there is $K \in \{1, \ldots, N-2\}$ such that $K < G(d(K+1)) < K+1$
3. If for K=0, $K < G(d(K+1)) < K+1$
4. If for K=N−1, $K < G(d(K+1)) < K+1$ If the sorted differentiation factor distribution satisfies the condition 1, then the terminals having indices belonging to the set k=1, ..., K are associated with the first resource group while the remaining terminals whose indices are k=K+1, ..., N are associated with the second resource group. There is thus no wireless terminal allocated to both resource groups in the case of satisfied condition 1. If the sorted differentiation factor distribution satisfies condition 2, on the other hand, then the terminals whose indices belong to the set k=1, ..., K, k=K+1, and k=K+2, ..., N are respectively associated with the first resource group, with the first and the second resource groups, and the second resource group. If the sorted differentiation factor distribution satisfies condition 3, then the terminal whose index is k=1 is associated with the first and the second resource groups while the terminal whose index is k=2, ..., N is associated with the second resource group. If the sorted differentiation factor distribution satisfies condition 4, then the terminals whose indices belong to the set k=1, ..., N−1 is associated with the first resource group while the terminal whose index is k=N is associated with the first and the second resource groups.

BRIEF DESCRIPTION OF THE DRAWINGS

FIG. 6 is a flowchart for the differentiation factor determination step of FIG. 5.

FIG. 7 is a flowchart for the proportional fair resource group share determination step of FIG. 5 if either/both resource groups provide a zero rate for all terminals or if there is only one terminal.

DETAILED DESCRIPTION

The present invention is applicable to a network in which two resource groups are allocated to one or more wireless terminals in a proportional fair manner. Turning now to the drawings, FIG. 1 illustrates an exemplary network, comprising a wireless terminal and three cells, two of which ($C_1$ and $C_3$) are high-power macrocells and the other one ($C_2$) is a low power picocell.

Figure 1:
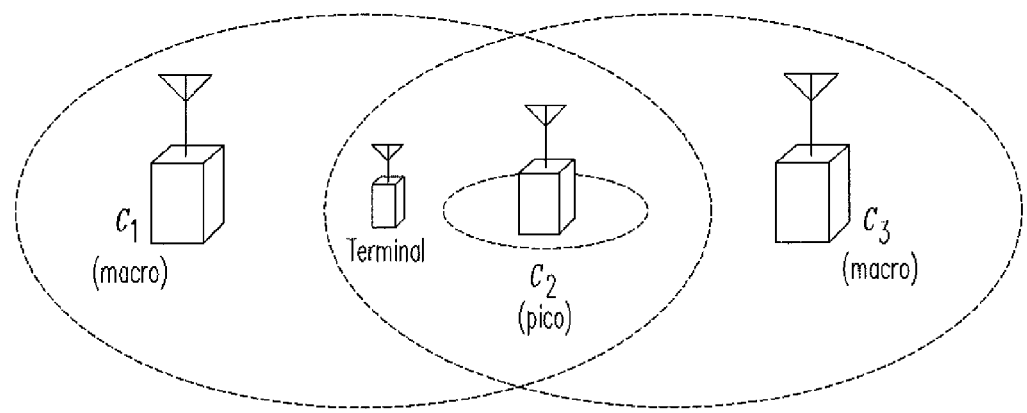
FIG. 1 shows an example network having two resource groups for allocation.

The wireless service of each cell in FIG. 1 depends upon the particular wireless protocol. For example, in the 3GPP Long Term Evolution (LTE) protocol, the wireless service is provided by nodes such as eNB (evolved Node B), RRH (Remote Radio Head), MME (Mobility Management Entity), and S-GW (Serving GateWay). In the IEEE 802.16 WiMAX protocol, wireless service is provided by nodes such as a BS (Base Station), Relay, and ASN-GW (Access Service Network GateWay). The resource allocation disclosed herein is independent of the particular wireless protocol being implemented to service the cells.

Each cell is coupled with a radio resource that is to be allocated to the terminals within the cell. The nature of the radio resource depends upon the particular wireless protocol being implemented to service the cells. For example, in an network implementing carrier aggregation, the radio resource takes the form of a carrier having a certain bandwidth at a frequency or a set of carriers under a carrier aggregation scenario. A carrier in a carrier aggregation scenario is referred as component carrier (CC)).

Regardless of the particular form of the resource group being allocated, many challenging wireless network management problems concern the allocation of two resource groups. For example, in the carrier aggregation scenario having two component carriers, it is necessary to decide for each terminal whether to serve it with either of the two CCs or both. In such a carrier aggregation network, a single CC (or a set of CCs) comprises a resource group. Many factors may need to be considered when allocating component carriers, such as the number of terminals, diversity, power consumption, channel feedback overhead, and so on. If there is only one terminal in the cell, the terminal may be served with both CCs, to increase the peak throughput. However, if there are large number of terminals in the cell, the amount of service assigned to each terminal may be small enough that it can be accommodated by only a single CC. In such a case, a terminal may be served with a single CC in order to decrease the power consumption of the terminal along the associated channel feedback and scheduling overhead. Due to the loss of frequency diversity on the other CC, the terminal throughput may decrease, but it should not be significant if the carrier bandwidth is large enough. If it is decided that each terminal is to be served with only one CC or that the number of terminals served with both CCs is to be minimized to one, the present invention provides a number of ways of deciding with which CC or CCs serve each terminal so that the proportional fairness as a system objective is satisfied.

Note that the resource group of the present invention need not be the same as the physical resource unit. For example, if there are two CCs in the 2 GHz band and one CC in the 3.5 GHz band, the two CCs in the 2 GHz band may be grouped together and form one resource group while the CC in the 3 GHz band may form the other resource group by itself. Thus, the size of the two resource groups may or may not be the same. Conversely, a large radio resource may be split into two smaller resource groups. For example, a CC may be split into two sets of resource partitions (RPs) in the frequency domain, in the time domain, or any other means, where each RP comprises one resource group. In such a case, the resource partition (RP) assignment problem may be also modeled as the radio resource management problem with two resource groups as discussed further herein.

Figure 2:
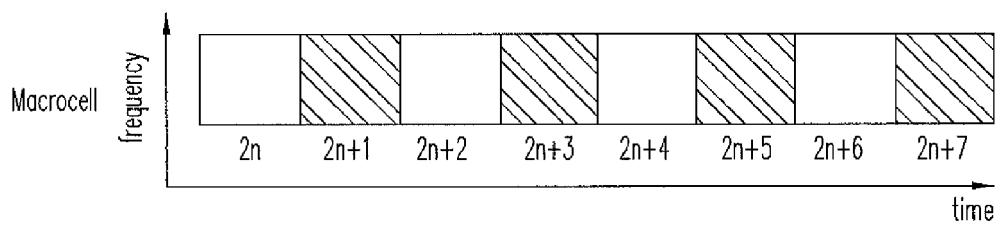
FIG. 2 illustrates a time-based division of resource groups.
Figure 3:
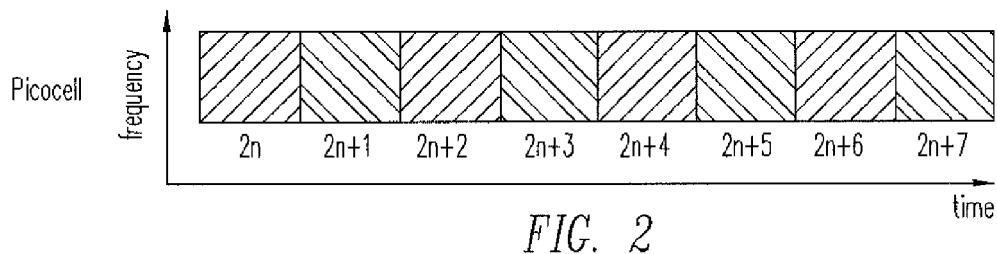
FIG. 3 illustrates a frequency-based division of resource groups.

FIG. 2 shows an example of time domain resource partition. In this example, the radio resource is slotted into sub-frames in the time domain and then indexed according to two resource partitions: $RP_1$, which corresponds to the odd sub-frames and $RP_2$, which corresponds to the even subframes. On the other hand, FIG. 3 shows an example of frequency domain resource partition. In this particular example, there are two resource partitions: $RP_1$, which is the one in the higher frequency portion of the CC and $RP_2$, which is the other one in the lower frequency portion of the CC.

The handoff (or cell association) decision problem can be regarded as yet another example of radio resource management with two resource groups. Here, a resource group is the radio resource of a single cell in the handoff decision problem, and the present invention provides a number of ways of deciding with which cell to serve the terminal so that the proportional fairness as a system objective is to be satisfied. The present invention applies to the above and other radio resource management problems with regard to the allocation of two radio resource groups. Moreover, any resource can be grouped or split to form the two radio resource groups. For the sake of simplicity, the present invention is explained herein-after, with reference to a generic resource group only, and the specifics of the resource groups is no longer discussed.

The quality of two resource groups may be different due to a number of reasons related to the specifics of the radio environment of the groups. For example, interference coordination is often used to reduce the performance degradation due to inter-cell interference. Such interference coordination is typically performed using different resource groups or, if they use the same resource group, they use it with different transmit power. As a result, the link quality perceived by a wireless terminal can be different depending on the resource group in which it is served and on the specifics of the inter-ference coordination rule that applies to the resource group.

In the example of FIG. 2, macrocells such as $C_1$ and $C_3$ of FIG. 1 do not transmit in odd-indexed subframes ($RP_1$), to reduce the interference from macrocells to picocells, while at even-indexed subframes ($RP_2$) both macrocells $C_1$ and $C_3$ as well as picocell $C_2$ transmit. Similar coordination can be done with the resource groups comprising frequency-domain resource partitions as in FIG. 3 or the multiple CCs in a carrier-aggregated scenario. For example, in FIG. 3, macrocells such as $C_1$ and $C_3$ of FIG. 1 use frequency band A only. However, a picocell such as picocell $C_2$ uses both frequency band A and also frequency band B.

Figure 4:
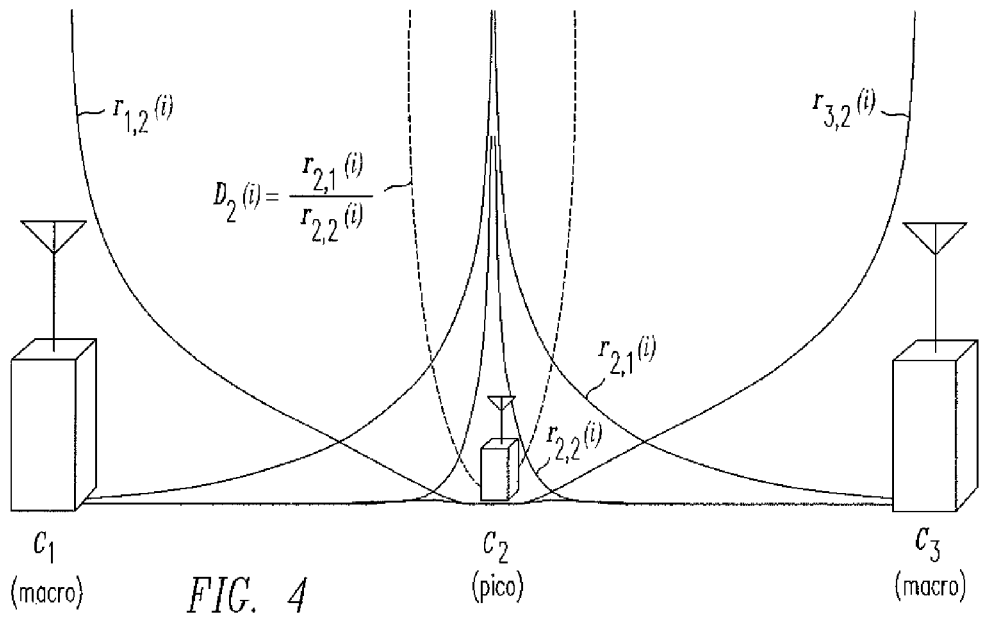
FIG. 4 illustrates data rates for the network of FIG. 1 using the resource groups of FIG. 2.

FIG. 4 illustrates the radio quality due to the interference coordination of FIG. 2. The path loss and the transmission power difference between the macrocells and the picocell are considered but for illustration clarity the impact of shadowing and small scale fading are ignored. It should be noted, however, that the scope of the present invention is applicable with or without shadowing and/or small scale fading. In the example of FIG. 2, the first resource group represents the odd-indexed sub-frames whereas the even-indexed sub-frames represents the second resource group. Here $r_{m,n}(i)$ represents the rate for a terminal i using resource group n in a cell m. Thus, $r_{1,2}(i)$ represents the rate for an $i_{th}$ terminal as served by macrocell $C_1$ using the second resource group. Similarly, $r_{2,2}(i)$ represents the rate for an $i_{th}$ terminal as served by picocell $C_2$ using the second resource group. Conversely, $r_{2,1}(i)$ represents the rate for an $i_{th}$ terminal as served by picocell $C_2$ using the first resource group. The rates vary depending upon the distance between a terminal and the serving cell. For example, rate $r_{1,2}(i)$ is of course strongest in the vicinity of macrocell $C_1$ and then drops toward zero as the terminal ranges from macrocell $C_1$ toward cells $C_2$ and $C_3$. Since the first resource group is not used by the macrocells, the rate achievable from the odd-indexed subframes $r_{2,1}(i)$ is clearly higher than that from the even-indexed subframes $r_{2,2}(i)$. In this scenario, picocell $C_2$ needs to decide how to allocate the resource groups. In that regard, a simple solution would be to assign each wireless terminal to the second resource group since it offers a higher data rate to each terminal than that achievable with the first resource group. Such a solution wastes the resources of the first resource group. Note that in the vicinity of the $C_2$ base station of FIG. 2, the rate achievable with the first resource group is reasonably close to that achievable with the second resource group. A compromise that achieves a proportional fairness would thus be to assign those terminals with the smaller difference in rate between the two resource groups to the first resource group while assigning all remaining to terminals to the second resource group. Such a proportional fairness solution will be discussed further herein. The following discussion provides a rigorous mathematical proof for the proportional fairness of algorithm 1 with regard to Table 1 above. The remaining algorithms will be merely summarized as the required mathematics is analogous.

Proportional Fairness

In general, a throughput distribution for N terminals, {x(i), i=1, 2, ..., N}, is proportional fair (PF) if it maximizes the following objective function:

$$f = \sum_{i=1}^{N} \log(x(i)) \quad (1)$$

where $$x(i) = r_1(i) \cdot b_1(i) + r_2(i) \cdot b_2(i) \quad (2)$$

and $r_1(i)$ is the unit share rate achievable by terminal i from a unit share of the first resource group resource, $r_2(i)$ is the unit share rate achievable by terminal i from a unit share of the second resource group resource, and $b_1(i)$ and $b_2(i)$ are the respective shares of the first and second resource group resource allocated to terminal i. By definition, $$\sum_{i=1}^{N} b_1(i) \leq 1 \quad (3)$$

$$\sum_{i=1}^{N} b_2(i) \leq 1 \quad (4)$$

$$b_1(i) \geq 0 \quad (5)$$

$$b_2(i) \geq 0 \quad (6)$$

$$r_1(i) \geq 0 \quad (7)$$

$$r_2(i) \geq 0 \quad (8)$$

The equality in equations (3) and (4) holds when resource groups 1 and 2 are fully utilized by the terminals. The inequality in equations (3) and (4) holds when there is any unassigned resource.

If $r_1(i)=r_2(i)=0$ and $x(i)=0$, the objective function (1) goes to negative infinity and is thus plainly not maximized. Furthermore, there is no need to allocate any radio resource to such a terminal for radio efficiency purposes. Hence, a terminal having no achievable rate using either resource group is not considered under the resource group allocations disclosed herein. A zero-rate terminal may have to wait without being scheduled until its radio quality is improved in at least one of the resource groups. Or, the terminal may be handed off to another cell with better radio quality so as to be scheduled from that cell. Accordingly, without loss of generality, the proportional fair allocation techniques disclosed herein assume (unless stated otherwise) that at least one of the rates in the two resource groups of each wireless terminal is greater than zero. That is, for all i=1, ..., N $$r_1(i) > 0 \text{ and } r_2(i) = 0, r_1(i) = 0 \text{ and } r_2(i) > 0, \text{ or } r_1(i) > 0 \text{ and } r_2(i) > 0, \quad (9)$$

The disclosed allocation algorithms concern the case of N≧2, since for N=1 there exists a trivial solution, which allocates all resource of both resource groups to the single terminal. Hereinafter it is thus assumed that N≧2.

The throughput x(i) can be formulated in many ways. For example, if $B_1$ and $B_2$ denote the respective sizes of the first and the second resource groups, and $\tilde{b}_1(i)$ and $\tilde{b}_2(i)$ denote the respective amount of the first and second resource group resource allocated to terminal i, then $$\tilde{b}_1(i) = B_1 \cdot b_1(i) \quad (10)$$

$$\tilde{b}_2(i) = B_2 \cdot b_2(i) \quad (11)$$

Also denote, as $\tilde{r}_1(i)$ and $\tilde{r}_2(i)$, the respective rates achievable by terminal i from the unit amount of the first resource group resource and the unit amount of the second resource group resource. Then $$\tilde{r}_1(i) = \frac{r_1(i)}{B_1} \quad (12)$$

$$\tilde{r}_2(i) = \frac{r_2(i)}{B_2} \quad (13)$$

$$x(i) = \tilde{r}_1(i) \cdot \tilde{b}_1(i) + \tilde{r}_2(i) \cdot \tilde{b}_2(i) \quad (14)$$

Hereinafter, we use the throughput description of equation (2). However the present invention can be easily modified to use the throughput description of equation (14). Regardless of how the throughputs are described, it can be seen that the resulting expression for the unit share rates takes into account the respective sizes of the two resource groups. And because the differentiation factor discussed further below is derived from the unit share rates, the differentiation factor also takes into account the respective sizes of the two resource groups. This is quite advantageous in that different-sized resource groups are not uncommon yet existing techniques for allocating resource groups cannot accommodate such variations.

Figure 5:
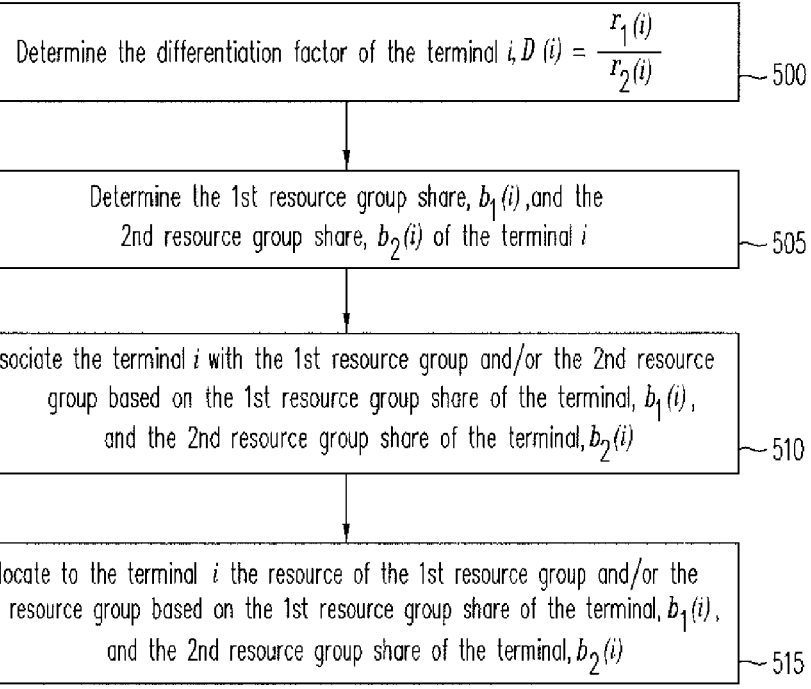
FIG. 5 is a flowchart for a proportional fair resource group association and allocation algorithm.

FIG. 5 illustrates a flow chart of determining the proportional fair resource allocation when there are two resource groups. An initial act 500 of determining the differentiation factor D(i) for each terminal may be performed as follows:

Differentiation Factors

Step 500 of FIG. 5 is further detailed in the flowchart of FIG. 6. A first step 600 is to determine $r_1(i)$, the unit share rate achievable from a unit share of the first resource group resource, and $r_2(i)$, the unit share rate achievable from a unit share of the second resource group resource. The unit share rate can be an instantaneous rate as seen in a particular instance of time or frequency domain resource unit (within a resource group), or an average rate that is averaged over a large time or frequency span (again within a resource group). The unit share rates depend not only on the radio quality of the resource groups but also upon their respective sizes as is apparent from equations (12) and (13).

For example, if the resource groups are time-domain resource partitions as in FIG. 2, the unit share rate may represent what is instantaneously achievable at specific subframes. In other words, $r_1(i)$ and $r_2(i)$ may represent the unit share rate achievable at a subframe 2n+1 and that at a subframe 2n+2, respectively. On the other hand, the unit share rate may represent what is obtained through averaging over a number of subframes. For example, with respect to subframes 2n+1 and 2n+2, $r_1(i)$ and $r_2(i)$ may respectively represent the unit share rate averaged over the last 100 odd subframes and that averaged over the last 100 even subframes. In this fashion, a fast fading radio channel can be either closely tracked or averaged out. Similarly, a channel with frequency selective fading can be either closely tracked or averaged out by the frequency component within a resource group.

The proportional fair resource allocation of the present invention may be applied in any of the unit share rate definitions discussed above. The association and the allocation to be explained later may be executed in line with the time and frequency span of the unit share rate definition. For example, when the unit share rate is instantaneous, the association and the resource allocation of terminals are enforced so that they comply with the association and the resource allocation of the present invention at each instance. If the unit share rate is averaged, the association and the resource allocation of terminals are enforced so that they comply with the association and the resource allocation of the present invention in an average sense.

The differentiation factor determination 500 continues by determining for the ith terminal if both $r_1(i)$ and $r_2(i)$ equal zero in a step 605. If so, the resulting zero-rate terminal is removed from consideration. The zero-rate terminal may have to wait without being scheduled until its radio quality is improved in at least one of the resource groups. Or, the terminal may be handed off to another cell with better radio quality so as to be scheduled from the new cell. Because both $r_1(i)$ and $r_2(i)$ equaling zero will thus be ruled out, in other words, because at least one of the unit share rates is greater than zero, the differentiation factor of a terminal can be defined as the ratio of the two rates in a step 610, for example, $$D(i) = \frac{r_1(i)}{r_2(i)} \tag{15}$$

If the unit share rate $r_2(i)=0$, then the differentiation factor $D(i)$ goes to (positive) infinity. If the differentiation factor goes to infinity for all terminals, then the trivial solution is to evenly allocate the resource of the second resource group to all terminals (as shown further below with regard to Lemma 2). If the differentiation factor of only some of the terminals goes to infinity, on the other hand, the resource allocation scheme according to the present invention provides non-trivial solutions by appropriately handling those terminals with infinite factor value at the sorting process as discussed further herein. Having thus completed step 500 of FIG. 5, the proportional fair resource allocation continues in a step 505, which concerns the determination of the first and second resource group shares (that is, $b_1(i)$ and $b_2(i)$).

As discussed above, the proportional fair resource allocation disclosed herein may be organized into four different algorithms of Table 1. The following discussion will focus on algorithm 1. Algorithms 2 through 4 may then be discussed more briefly in that these algorithms are performed analogously as discussed with regard to algorithm 1.

Proportional Fair Resource Allocation

Step 505 is further explained with reference to the flowchart of FIG. 7. If the differentiation factors of the terminals are either all zero or all infinity, then the proportional fair resource allocation is quite straightforward from Lemma 2. In a step 700, the unit share rates for the first resource groups are examined to see if they are all zero, in other words, $r_1(i)=0$ for all i=1, 2, . . . , N. If so, then the second resource group share $b_2(i)$ is set to 1/N in a step 705 as discussed further with regard to Lemma 2. In conjunction, $b_1(i)$ can take any value as long as equations (3) and (5) are satisfied. In a step 710, the second resource group rates are examined to determine if they equal zero for all terminals (indicating that the differentiation factors of the terminals are all infinity). In other words, step 710 determines if $r_2(i)=0$ for all i=1, 2, . . . , N. Should step 710 determine that the differentiation factors are all infinity, then again by Lemma 2, the first resource group share $b_1(i)$ for the terminal may be set to 1/N in a step 715. In that case, $b_2(i)$ can take any values as long as equations (4) and (6) are satisfied.

After these steps, there should be at least one terminal with above-zero, finite rate in each of the resource groups. If there is just one such terminal as determined in a step 720, then it should have an above-zero, finite rate in both resource groups. And the proportional fair resource allocation for such a case is to allocate the resource of both resource groups to the single terminal as performed in a step 725.

Figure 8:
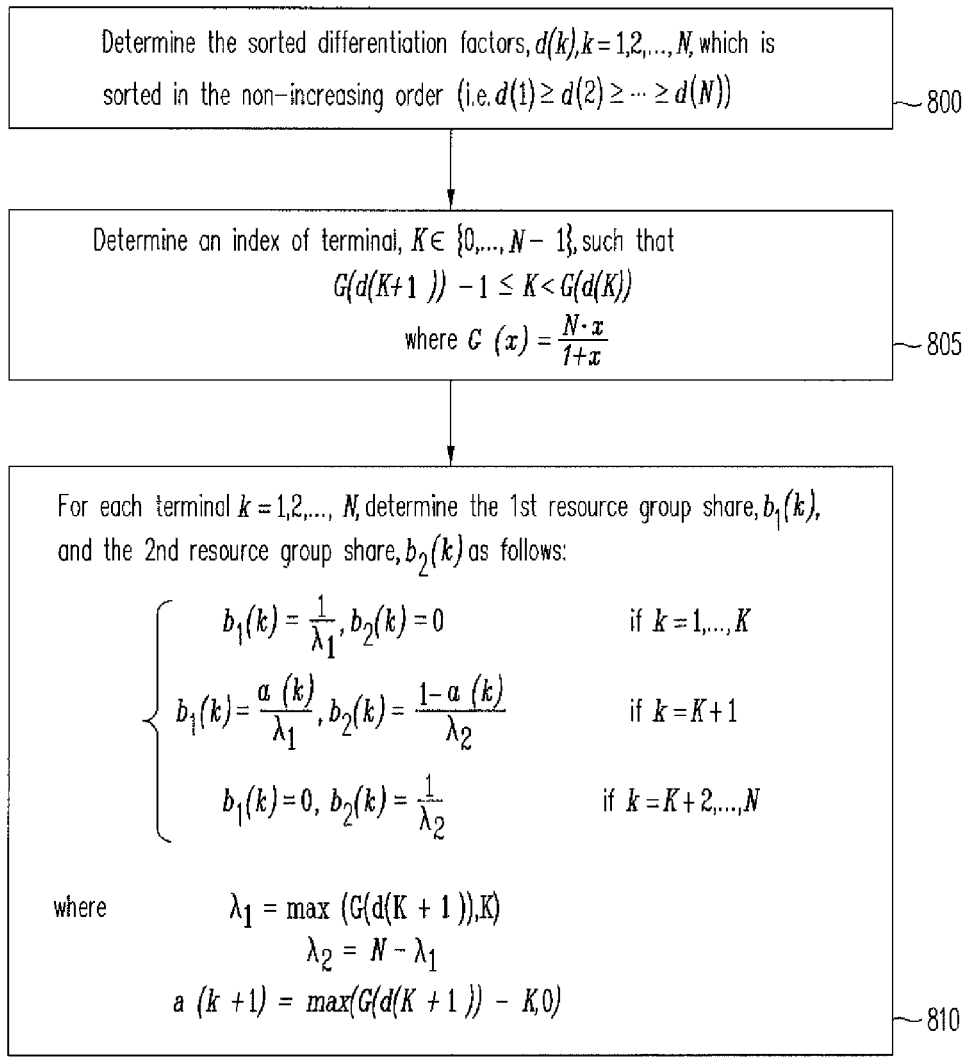
FIG. 8 is a flowchart for an embodiment of the proportional fair resource group share determination step of FIG. 5 if either/both of the resource groups provide a non-zero rate for plural terminals.
Figure 9:
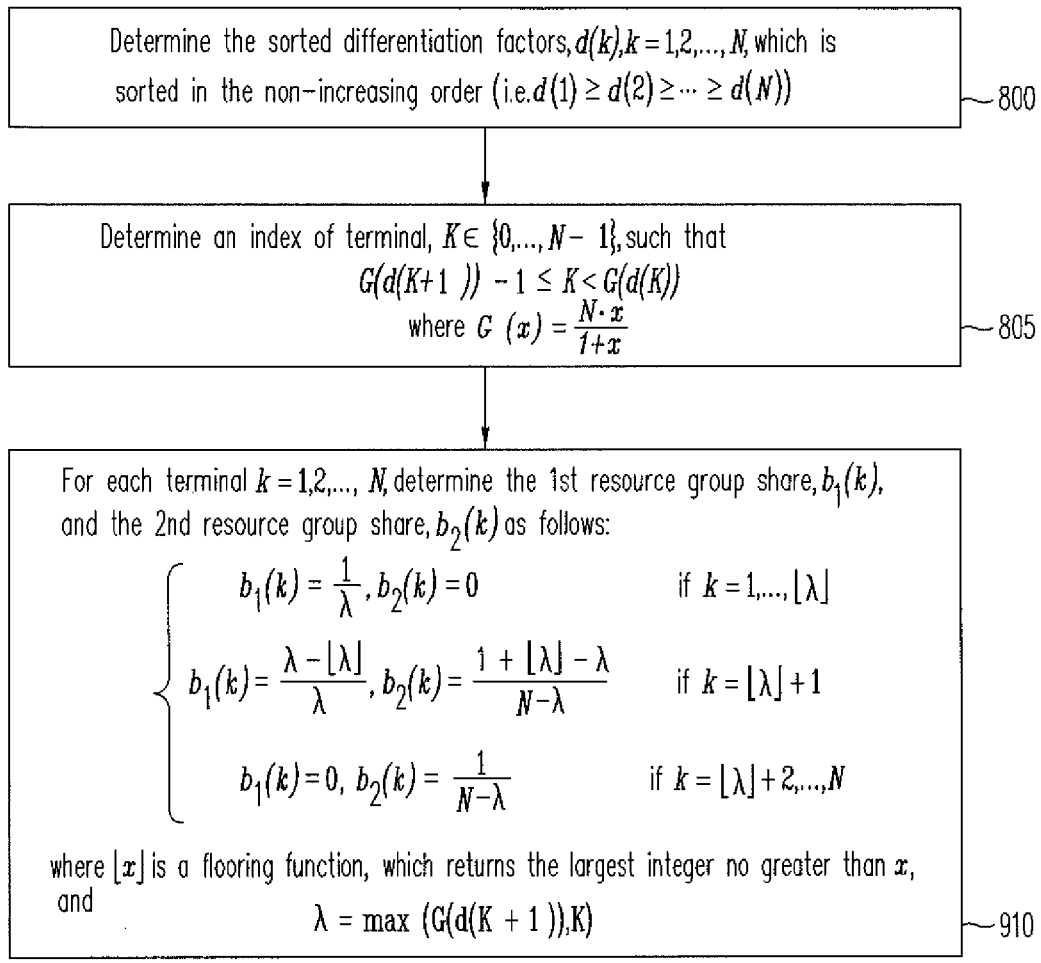
FIG. 9 is a flowchart for an alternative embodiment of the proportional fair resource group share determination step of FIG. 5 if either/both of the resource groups provide a non-zero rate for plural terminals.

If step 725 determines that there are two or more such terminals, on the other hand, the proportional fair resource allocation with two resource groups may be obtained according to the procedures of FIG. 8 or FIG. 9. These figures concern alternative embodiments for algorithm 1 of Table 1 discussed above. A first step 800 in both procedures is thus to sort the differentiation factors in a monotonically decreasing order. The terminals with infinite differentiation factors are located at the beginning of the list. The sorted differentiation factors may be denoted as d(k), (k=1, 2, . . . , N), the index of the sorted differentiation factors as k, and the index of the unsorted differentiation factors as i.

Then $$d(1) \geq d(2) \geq \ldots \geq d(N) \tag{16}$$

$$\forall k, \exists i \text{ such that } k = \Pi(i) \tag{17}$$

where $\Pi(i)$ is a permutation function that re-indexes the terminals according to the sorting. Hereinafter, i shall denote the terminal index before differentiation factor sorting whereas k denotes the terminal index after sorting.

A next step 805 in the procedures of FIGS. 8 and 9 is to determine an index of a terminal $K \in \{0, 1, \ldots, N-1\}$ in the sorted differentiation factor list, such that $$G(d(K+1)) - K < G(d(K)) \tag{18}$$

where $$G(x) = \frac{N \cdot x}{1+x}.$$

Figure 10:
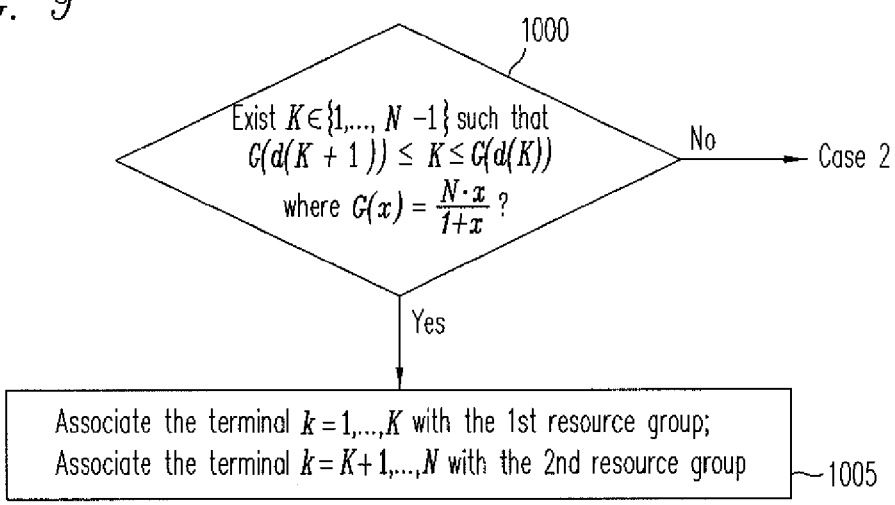
FIG. 10 is a flowchart detailing the association of terminals with resource groups in an alternative embodiment when cases 1 or 3 are true.

An alternative to step 805 is discussed below with regard to FIGS. 10 and 11. With regard to step 805, the proportional fair resource allocation with two resource groups can be determined in a step 810 of FIG. 8 as:

$$\begin{cases} b_1(k) = \frac{1}{\lambda_1}, b_2(k) = 0 & \text{if } k = 1, \ldots, K \\ b_1(k) = \frac{a(k)}{\lambda_1}, b_2(k) = \frac{1-a(k)}{\lambda_2} & \text{if } k = K+1 \\ b_1(k) = 0, b_2(k) = \frac{1}{\lambda_2} & \text{if } k = K+2, \ldots, N \end{cases} \tag{19}$$

where $$\lambda_1 = \max(G(d(K+1)), K) \tag{20}$$

$$\lambda_2 = N - \lambda 1 \tag{21}$$

$$a(K+1) = \max(G(d(K+1)) - K, 0) \tag{22}$$

Alternatively, the proportional fair resource group allocation can be determined in a step 910 of FIG. 9 as:

$$\begin{cases} b_1(k) = \frac{1}{\lambda}, b_2(k) = 0 & \text{if } k = 1, \ldots, \lfloor \lambda \rfloor \\ b_1(k) = \frac{\lambda - \lfloor \lambda \rfloor}{\lambda}, b_2(k) = \frac{1 + \lfloor \lambda \rfloor - \lambda}{N - \lambda} & \text{if } k = \lfloor \lambda \rfloor + 1 \\ b_1(k) = 0, b_2(k) = \frac{1}{N - \lambda} & \text{if } k = \lfloor \lambda \rfloor + 2, \ldots, N \end{cases} \quad (23)$$

where $\lfloor x \rfloor$ is a flooring function, which returns the largest integer no greater than x, and $$\lambda = \max(G(d(K+1)), K) \quad (24)$$

Here, $b_1(k)$ and $b_2(k)$ are the resource shares at the first and the second resource groups of the kth terminal in the sorted differentiation factor list. These are different, in terms of the terminal indexing, from $b_1(i)$ and $b_2(i)$, the resource shares at the first and the second resource groups of the terminal in the unsorted differentiation factor list. It is straightforward to convert between those two by equation (17). Therefore, at steps 810 and 910, the resource shares of each terminal in the first and the second resource groups are determined by either equations (19) through (22) or equations (23) and (24), respectively. It will be appreciated that the alternative procedures of FIGS. 8 and 9 produce the exactly same resource allocation.

Referring back to FIG. 5, the resource group shares determined with regard to the procedures of FIG. 8 or 9 are used in a step 505 to determine the resource shares of each terminal in the first and the second resource groups with reference to the terminal index in the sorted list or the terminal index in the unsorted list (through a re-indexing of terminals by equation (17)). Then, at a next step 510, based on the resource shares of each terminal in the first and the second resource groups, each terminal is associated with the resource groups. To be more specific, each terminal is associated with the first resource group if the first resource group share for the terminal is above zero. Similarly, each terminal is associated with the second resource group if the second resource group share for the terminal is above zero. If associated with a resource group, a terminal may be allocated with the resource of the resource group at the allocation step as discussed further with regard to a step 515 of FIG. 5.

Association may require additional procedures. For example, if a resource group comprises a CC or CCs in a carrier aggregation scenario, a terminal may need to activate the CC or CCs to be associated with the resource group. As another example, in a resource partition assignment problem, association of a terminal with a resource group may involve a configuration of measurement, reporting, and scheduling of the terminal to be performed on the resource partition constituting the associated resource group. Finally, in a handoff scenario, association of a terminal with a resource group may involve a handoff to another cell, unless the associated resource group is the resource of the current cell.

Referring again to FIG. 5, at step 515, based on the resource shares of each terminal in the first and the second resource groups, each terminal is allocated with the resource group(s) accordingly. To be more specific, the resource group share allocated to each terminal is determined by $b_1(k)$ and $b_2(k)$ as discussed above. In that regard, a terminal is allocated with a resource group only if the terminal is already associated with the resource group. It should be noted, however, the present invention is agnostic to the specific ways of enforcing the resource shares in the allocation. For example, two weighted round robin schedulers in charge of allocating the resource of one of the two resource groups can be used together with the present invention by setting the weight of each terminal according to the resource shares.

The resource shares of terminals may be enforced in instantaneous sense or in an average manner. For example, in a time-domain resource partition embodiment as in FIG. 2, the resource of subframes 2n+1 and 2n+2 can be divided into smaller units and then allocated to the terminals so that the shares of the resource allocated to terminals correspond to $b_1(k)$ and $b_2(k)$, respectively. In that case, the allocation of the subframe occurs on an instantaneous basis. Alternatively, the shares of the resource allocated to terminals can be made to correspond to $b_1(k)$ and $b_2(k)$, in a larger time and frequency span (e.g. for the last one hundred odd subframes and 100 even subframes), although at the specific subframes 2n+1 and 2n+2, the resource allocation may diverge from $b_1(k)$ and $b_2(k)$. One example of such alternative with average compliance is to allocate the large chunk of resource within a resource group one (two) to a terminal with the allocation probability of $b_1(k)$ ($b_2(k)$) at each subframes. Although not guaranteed in each subframe, the compliance is achieved in the long term due to the law of large numbers by repeating such probabilistic allocation for a long enough period of time.

Depending on the scenario, it may not be appropriate (in terms of complexity and battery consumption, for example) to compute the resource shares when determining the association. In such case, the association can be determined without computing the resource shares as in steps 810 and 910 of FIGS. 8 and 9, respectively. As an alternative to step 805, the index of terminal k (in the sorted differentiation factor list) can be determined in a number of steps with regard to three classifications of the sorted differentiation factors, which are designated herein as cases 1 through 3. Case 1 corresponds to the existence of an index k such that $G^{-1}(k)$ equals $d(k)$. Otherwise, either case 2 or case 3 is true. In case 2, there is a k such that $G^{-1}(k) < d(k+1)$, $G^{-1}(k+1) > d(k+1)$, and $G^{-1}(k) < d(k)$. In case 3, there is a k such that $G^{-1}(k) < d(k)$, $G^{-1}(k+1) > d(k+1)$, and $G^{-1}(k) \geq d(k+1)$. The derivation of these cases is discussed further below.

Given these 3 cases, the index k can be determined and the terminals associated accordingly as follows. Referring now to FIG. 10, it is first tested in a step 1000 if there exists $K \in \{1, \ldots, N-1\}$ such that $G(d(K+1)) \leq K \leq G(d(K))$. If so, the resource allocation corresponds to case 1 or case 3. In particular, as shown below in equations (106) and (152), the resource share of a terminal is above zero for the first resource group if the terminal's sorted index k belongs to the set $k=1, \ldots, K$; and the resource share of a terminal for the second resource group is above zero if its sorted index k belongs to the set $k=K+1, \ldots, N$. So at a subsequent step 1005 in FIG. 10, a terminal is associated with the allocated resource group accordingly. If the result of the determination in step 1000 is false, then it corresponds to case 2 as discussed further below, and the procedure of FIG. 11 follows.

Figure 11:
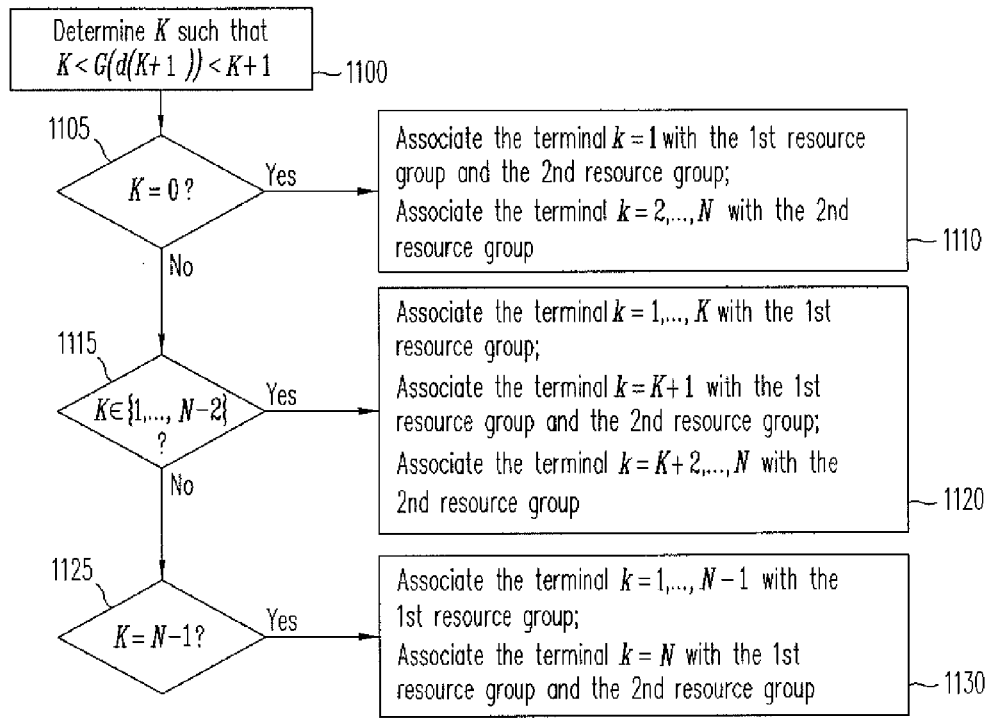
FIG. 11 is a flowchart detailing the association of terminals with resource groups in an alternative embodiment when case 2 is true.

Referring to FIG. 11, because it corresponds to case 2, the resource share of a terminal can be determined by equation (130) discussed below. In an initial step 1100, the sorted index of a terminal K such that $K < G(d(K+1)) < K+1$ is determined. Then it is tested if $K=0$ at a step 1105. If so, there is no terminal that is allocated with the first resource group only according to a step 1110. More specifically, $b_1(k)=1$, $$b_2(k) = \frac{1 - G(d(1))}{N - G(d(1))}$$

if k=1 and $b_1(k)=0$, $$b_2(k) = \frac{1}{N - G(d(1))}$$

for k=2, ..., N.

Therefore, if a terminal's index k=1, then the terminal is associated with both the first and the second resource groups; and a terminal is associated with the second resource group if its index k=2, ..., N.

If the result of test 1105 is false, on the other hand, it is tested in a step 1115 if K∈{1, ..., N−2}. Then as shown below in equation (130), the resource share of a terminal is above zero in a step 1120 for the first resource group if the terminal's index k=1, ..., K+1; and the resource share of a terminal for the second resource group is above zero if its index k= K+1, ..., N. A terminal having sorted index k equaling K+1 is associated with both resource groups. If the result of test 1115 is false again, then a step 1125 tests whether k=N−1. In that case, there is no terminal that is allocated with the second resource group only in a step 1130. More specifically, $$b_1(k) = \frac{1}{G(d(N))},$$

$b_2(k)=0$ if k=1, ..., N−1 and $$b_1(k) = \frac{G(d(N)) - N + 1}{G(d(N))},$$

$b_2(k)=1$ for k=N. Therefore, if a terminal's index belongs to the set k=1, ..., N−1 then the terminal is associated with the first resource group; and a terminal is associated with the first and the second resource groups if its index satisfies k=N.

The derivation of cases 1 through 3 for the proportional fair allocations schemes will now be discussed.

Mathematical Derivation for Algorithm 1 with Respect to Cases 1 Through 3.

The derivation of the PF schemes uses the Kuhn-Tucker condition as follows. Since the objective function of equation (1) is strictly concave and the feasible region defined by equations (3) through (6) is compact, the optimal solution to the maximization problem exists. Let $$L = f - \sum_{n=1}^{2} \lambda_n \cdot \left( \sum_{i=1}^{N} b_n(i) - 1 \right).$$

The Kuhn-Tucker condition for the maximization problem of equation (1) is:

for all i=1, ..., N and for all n=1, 2

$$\frac{dL}{db_n(i)} = \frac{df}{db_n(i)} - \lambda_n = \frac{r_n(i)}{x(i)} - \lambda_n \leq 0 \tag{25}$$

$$b_n(i) \geq 0 \tag{26}$$

$$b_n(i) \cdot \frac{dL}{db_n(i)} = b_n(i) \cdot \left( \frac{r_n(i)}{x(i)} - \lambda_n \right) = 0 \tag{27}$$

and for all n=1, 2

$$\sum_{i=1}^{N} b_n(i) \leq 1 \tag{28}$$

$$\lambda_n \geq 0 \tag{29}$$

$$\lambda_n \cdot \left( 1 - \sum_{i=1}^{N} b_n(i) \right) = 0 \tag{30}$$

where N(≧2) represents the number of terminals, i=1, ..., N represent the unsorted terminal index and n=1, 2 represent the resource group number.

If the throughput x(i) equals zero, the objective function of equation (1) goes to negative infinity and clearly is not maximized. Thus, for all i=1, ..., N $$x(i) > 0 \tag{31}$$

The derivation of cases 1 through 3 requires the following lemmas.

Lemma 1

If there is i∈{1, ..., N} and n∈{1, 2} such that $r_n(i)$>0, then for such n $$\lambda_n > 0 \tag{32}$$

$$\sum_{i=1}^{N} b_n(i) = 1 \tag{33}$$

A proof of lemma 1 begins by letting $r_n(i)$>0 for i=$\hat{i}$ and n=$\hat{n}$. Then from equation (25)

$$\lambda_{\hat{n}} \geq \frac{r_{\hat{n}}(\hat{i})}{x(\hat{i})} \tag{34}$$

Then from equation (31) and the assumption of the lemma, $$\lambda_{\hat{n}} \geq \frac{r_{\hat{n}}(\hat{i})}{x(\hat{i})} > 0 \tag{35}$$

which proves equation (32). Now plugging equation (32) into equation (30) proves equation (33).

Lemma 2

If $r_n(1) = \ldots = r_n(N) = 0$ for n=$n_0$∈{1, 2}, then the solution to the maximization problem of equations (1) through (8) is as follows:

If n=$n_0$, then $b_n(i)$, i=1, ..., N take any values that satisfies equations (26) and (28).

If n≠$n_0$, then for all i=1, ..., N, $$b_n(i) = \frac{1}{N} \tag{36}$$

As a proof of lemma 2, it is first assumed that n=$n_0$. Since $r_{n_0}(1) = \ldots = r_{n_0}(N) = 0$, and x(i)>0 (due to equation (31)), equation (47) below can be expressed by $$\forall i=1, \ldots, N, \ b_{n_0}(i) \cdot \lambda_{n_0} = 0 \tag{37}$$

By equation (37), $\lambda_{n_0}=0$ or $b_{n_0}(1)=\ldots=b(N)=0$. Assume the former is true. Then equations (46), (47), (29), and (30) are satisfied. So it is sufficient for $b_{n_0}(i)$, $i=1,\ldots,N$ to satisfy equations (26) and 28). Now assume the latter is true. Then by equation (30), $\lambda_{n_0}=0$. Also $b_{n_0}(1)=\ldots=b_{n_0}(N)=0$ satisfy equations (26) and (28). Under either case, only equations (26) and (28) need to be satisfied. So the lemma is proven for $n=n_0$.

Now it is assumed that $n \neq n_0$. For brevity, the following discussion will refer to equations simply using their numbers in parentheticals. By (9), $$\forall i=1,\ldots,N, r_{n \neq n_0}(i) > 0 \tag{38}$$

Then by Lemma 1

$$\lambda_{n \neq n_0} > 0 \tag{39}$$

$$\sum_{i=1}^{N} b_{n \neq n_0}(i) = 1 \tag{40}$$

On the other hand, from (2)

$$x(i) = r_{n_0}(i) \cdot b_{n_0}(i) + r_{n \neq n_0}(i) \cdot b_{n \neq n_0}(i) = r_{n \neq n_0}(i) \cdot b_{n \neq n_0}(i) \tag{41}$$

From (31), $$\forall i=1,\ldots,N, b_{n \neq n_0}(i) > 0 \tag{42}$$

Then by (42) and (27)

$$\frac{r_{n \neq n_0}(i)}{x(i)} - \lambda_{n \neq n_0} = 0 \tag{43}$$

From (41) and (43), $$b_{n \neq n_0}(i) = \frac{1}{\lambda_{n \neq n_0}} \tag{44}$$

From (40) and (44)

$$\lambda_{n \neq n_0} = N \tag{45}$$

Plugging (45) into (44) gives (36). So the lemma is proven for $n \neq n_0$.

Hereinafter, unless stated otherwise, it is assumed that the resource allocation does not concern Lemma 2. In order words, we assume that for all $n=1, 2$, there is at least one $i \in \{1,\ldots,N\}$ such that $r_n(i) > 0$. The Kuhn-Tucker condition for the maximization problem of (1) under such an assumption is:

for all $i=1,\ldots,N$ and for all $n=1, 2$ $$\frac{dL}{db_n(i)} = \frac{df}{db_n(i)} - \lambda_n = \frac{r_n(i)}{x(i)} - \lambda_n \leq 0 \tag{46}$$

$$b_n(i) \cdot \frac{dL}{db_n(i)} = b_n(i) \cdot \left(\frac{r_n(i)}{x(i)} - \lambda_n\right) = 0 \tag{47}$$

and for all $n=1, 2$ $$\sum_{i=1}^{N} b_n(i) = 1 \tag{48}$$

$$\lambda_n > 0 \tag{49}$$

where $N (\geq 2)$ represents the number of terminal, $i=1,\ldots,N$ represent the terminal index and $n=1, 2$ represent the resource group number.

Note that $b_1(i)=b_2(i)=0$ should be ruled out since then the throughput satisfies $x(i)=0$, violating (31). Thus, for all $i=1,\ldots,N$, one of the following needs to be satisfied:

$$b_1(i) > 0 \text{ and } b_2(i) = 0 \tag{50}$$

$$b_1(i) > 0 \text{ and } b_2(i) > 0 \tag{51}$$

$$b_1(i) = 0 \text{ and } b_2(i) > 0 \tag{52}$$

If (5) is satisfied, by (2), (47), and (46)

$$\frac{r_1(i)}{x(i)} = \frac{r_1(i)}{r_1(i) \cdot b_1(i)} = \frac{1}{b_1(i)} = \lambda_1 \tag{53}$$

$$\frac{r_2(i)}{x(i)} = \frac{r_2(i)}{r_1(i) \cdot b_1(i)} \leq \lambda_2 \tag{54}$$

Plugging (53) into (54) and rearranging for the same resource group, $$\frac{r_2(i)}{\lambda_2} \leq \frac{r_1(i)}{\lambda_1} \tag{55}$$

If (52) is satisfied, by symmetry, $$\frac{1}{b_2(i)} = \lambda_2 \tag{56}$$

$$\frac{r_2(i)}{\lambda_2} \geq \frac{r_1(i)}{\lambda_1} \tag{57}$$

Finally, if (51) is satisfied, by (47)

$$\frac{r_1(i)}{x(i)} = \frac{r_1(i)}{r_1(i) \cdot b_1(i) + r_2(i) \cdot b_2(i)} = \lambda_1 \tag{58}$$

$$\frac{r_2(i)}{x(i)} = \frac{r_2(i)}{r_1(i) \cdot b_1(i) + r_2(i) \cdot b_2(i)} = \lambda_2 \tag{59}$$

Rearranging (58) and (59) for $1/x(i)$, $$\frac{1}{x(i)} = \frac{r_2(i)}{\lambda_2} = \frac{r_1(i)}{\lambda_1} \tag{60}$$

Multiplying (58) and (59) respectively by $b_1(i)$ and $b_2(i)$ and summing them up, $$\lambda_1 \cdot b_1(i) + \lambda_2 \cdot b_2(i) = \frac{r_1(i) \cdot b_1(i)}{r_1(i) \cdot b_1(i) + r_2(i) \cdot b_2(i)} + \frac{r_2(i) \cdot b_2(i)}{r_1(i) \cdot b_1(i) + r_2(i) \cdot b_2(i)} \quad (61)$$
$$= 1$$

Note that (53) and (56) can also be represented by (61) by plugging (50) and (52), respectively. Therefore, regardless of the three cases (50) through (52), each terminal should satisfy $$\lambda_1 \cdot b_1(i) + \lambda_2 \cdot b_2(i) = 1 \quad (62)$$

Also, depending on the cases, one of (54), (57), and (60) should be satisfied.
By distinguishing the equality and the inequality in (54) and (57), each terminal should satisfy (62) and one of the following:

$$b_1(i) > 0, b_2(i) = 0, \text{ and } \frac{r_1(i)}{\lambda_1} > \frac{r_2(i)}{\lambda_2} \quad (63)$$

$$b_1(i) > 0, b_2(i) = 0, \text{ and } \frac{r_1(i)}{\lambda_1} = \frac{r_2(i)}{\lambda_2} \quad (64)$$

$$b_1(i) > 0, b_2(i) > 0, \text{ and } \frac{r_1(i)}{\lambda_1} = \frac{r_2(i)}{\lambda_2} \quad (65)$$

$$b_1(i) = 0, b_2(i) > 0, \text{ and } \frac{r_1(i)}{\lambda_1} = \frac{r_2(i)}{\lambda_2} \quad (66)$$

$$b_1(i) = 0, b_2(i) > 0, \text{ and } \frac{r_1(i)}{\lambda_1} < \frac{r_2(i)}{\lambda_2} \quad (67)$$

Plugging (63) through (67) into (62) and rearranging, $$\begin{cases} b_1(i) = \frac{1}{\lambda_1} > 0, b_2(i) = 0 & \text{if } \frac{r_1(i)}{\lambda_1} > \frac{r_2(i)}{\lambda_2} \\ b_1(i) = \frac{1}{\lambda_1} > 0, b_2(i) = 0, \\ \lambda_1 \cdot b_1(i) + \lambda_2 \cdot b_2(i) = 1, \\ b_1(i) > 0, b_2(i) > 0, \text{ or} & \text{if } \frac{r_1(i)}{\lambda_1} = \frac{r_2(i)}{\lambda_2} \\ b_1(i) = 0, b_2(i) = \frac{1}{\lambda_2} > 0 \\ b_1(i) = 0, b_2(i) = \frac{1}{\lambda_2} > 0 & \text{if } \frac{r_1(i)}{\lambda_1} < \frac{r_2(i)}{\lambda_2} \end{cases} \quad (68)$$

Lemma 3
If (68) is the solution to the maximization problem of (1) through (8), then.

$$\lambda_1 + \lambda_2 = N \quad (69)$$

To begin the proof, note that if (68) is the solution, it satisfies (3), (4), and (62). Summing up (62) for all i $$\sum_{i=1}^{N} (\lambda_1 \cdot b_1(i) + \lambda_2 \cdot b_2(i)) = N \quad (70)$$

Plugging (3) and (4) into (70) proves the lemma.
A discussion of the remaining lemmas is prefaced by the following discussion of sorting. With sorted differentiation factors as in (16), the Kuhn-Tucker conditions (68) can be rewritten as $$\begin{cases} b_1(k) = \frac{1}{\lambda_1} > 0, b_2(k) = 0 & \text{if } d(k) > \frac{\lambda_1}{\lambda_2} \\ b_1(k) = \frac{1}{\lambda_1} > 0, b_2(k) = 0, \\ \lambda_1 \cdot b_1(k) + \lambda_2 \cdot b_2(k) = 1, \\ b_1(k) > 0, b_2(k) > 0, \text{ or} & \text{if } d(k) = \frac{\lambda_1}{\lambda_2} \\ b_1(k) = 0, b_2(k) = \frac{1}{\lambda_2} > 0 \\ b_1(k) = 0, b_2(k) = \frac{1}{\lambda_2} > 0 & \text{if } d(k) < \frac{\lambda_1}{\lambda_2} \end{cases} \quad (71)$$

Taking advantage of (16) and rearranging the case of $$d(k) = \frac{\lambda_1}{\lambda_2}$$

in (71) gives $$\begin{cases} b_1(k) = \frac{1}{\lambda_1} > 0, b_2(k) = 0 & \text{if } k = 1, \ldots, n_1 \\ \lambda_1 \cdot b_1(k) + \lambda_2 \cdot b_2(k) = 1, \\ b_1(k) > 0, b_2(k) > 0 & \text{if } k = n_1 + 1, \ldots, n_2 - 1 \\ b_1(k) = 0, b_2(k) = \frac{1}{\lambda_2} > 0 & \text{if } k = n_2, \ldots, N \end{cases} \quad (72)$$

where $n_1$ and $n_2$ are integers satisfying $0 \leq n_1 < n_2 \leq N+1$, $n_1=0$ indicating that there is no k such that $b_1(k)>0$, $b_2(k)=0$, $n_2=n_1+1$ indicating that there is no k such that $b_1(k)>0$, $b_2(k)>0$, and $n_2=N+1$ indicating there is no k such that $b_1(k)=0$, $b_2(k)>0$.

A resource allocation scheme where there is at least one terminal whose resource group shares are both non-zero (i.e. $b_1(k)>0$ and $b_2(k)>0$) is referred to herein as an overlapping scheme. Otherwise, the resource allocation scheme is referred as a non-overlapping scheme. By (72) and its definition, for a non-overlapping scheme, $$n_2 = n_1 + 1 \quad (73)$$

For an overlapping scheme, $$n_2 = n_1 + m \quad (74)$$

where $m=2, \ldots, N-n_1$. Here we need examine only $m=2$, because overlapping schemes for other cases exist only for limited instances of differentiation factor distribution and are not desirable in terms of resource allocation overhead issues, such as power consumption and feedback. Here, we are interested in $n_1$, $n_2$, $\lambda_1$, and $\lambda_2$ that makes (72) the solution to the maximization problem of (1) through (8). We first prove the following lemma.
Lemma 4
If (72) is the solution to the maximization problem of (1) through (8), then $$n_1 \leq \lambda_1 \quad (75)$$

$$n_2 \geq \lambda_1 + 1 \quad (76)$$

As a proof, first we prove (75). If $n_1=0$, (75) follows immediately from $\lambda_1>0$. If $n_1 \geq 1$, then there exists k such that $1 \leq k \leq n_1$ and $$b_1(k) = \frac{1}{\lambda_1} > 0, \ b_2(k) = 0.$$

Then by (3) and (72), $$\sum_{k=1}^{n_1} b_1(k) = \frac{n_1}{\lambda_1} \leq 1 \qquad (77)$$

Hence (75) is proven. Now we prove (76). If $n_2=N+1$, by Lemma 3

$$n_2 = N+1 = (\lambda_1 + \lambda_2) + 1 \qquad (78)$$

Then $n_2 > \lambda_1 + 1$ follows from $\lambda_2 > 0$ and (78). Now, if $n_2 \leq N$ then there exists k such that $n_2 \leq k \leq N$ and $b_1(k)=0$, $$b_2(k) = \frac{1}{\lambda_2} > 0.$$

Then by (4) and (72):

$$\sum_{k=n_2}^{N} b_2(k) = \frac{N - n_2 + 1}{\lambda_2} = \frac{N - n_2 + 1}{N - \lambda_1} \leq 1 \qquad (79)$$

and $$N - n_2 + 1 \leq N - \lambda_1 \qquad (80)$$

Hence, (80) is proven.
Note that equality in (75) and (76) holds if and only if $n_2 = n_1 + 1$.
By Lemma 3, the threshold in (71) can be expressed using a function, $$G(x) = \frac{N \cdot x}{1 + x}.$$

$$\frac{\lambda_1}{\lambda_2} = \frac{\lambda_1}{N - \lambda_1} = G^{-1}(\lambda_1) \qquad (81)$$

where $$G^{-1}(x) = \frac{x}{N - x}$$

is the inverse of G(x). Then the following lemmas hold.
Lemma 5
Let (71) and (72) be the solution to the maximization problem of (1) through (8), then if $$d(k) > \frac{\lambda_1}{\lambda_2} = G^{-1}(\lambda_1)$$

for $k \epsilon \{1, 2, \ldots, N\}$ then $1 \leq k \leq n_1$

Lemma 6
Let (71) and (72) be the solution to the maximization problem of (1) through (8), then if $$d(k) < \frac{\lambda_1}{\lambda_2} = G^{-1}(\lambda_1)$$

for $k \epsilon \{1, 2, \ldots, N\}$ then $n_2 \leq k \leq N$
Lemma 7
Let (71) and (72) be the solution to the maximization problem of (1) through (8), then if $n_1 + 1 \leq k \leq n_2 - 1$ for $k \epsilon \{1, 2, \ldots, N\}$ then $$d(k) = \frac{\lambda_1}{\lambda_2} = G^{-1}(\lambda_1)$$

From (71), (72) and (81), it is straightforward to prove Lemmas 5-7; hence their proof is left out for brevity. Here, it is important to note that the converses of the above lemmas are not generally true. The derivation of cases 1 through 3 may now be addressed.
Note that G(x) and its inverse, $$G^{-1}(x) = \frac{x}{N - x},$$

are strictly increasing for $0 \leq x < N$. Also the range of $G^{-1}(x)$ is $[0, \infty)$ for $0 \leq x < N$. On the other hand, d(k) is monotonically decreasing for $k=1, 2, \ldots, N$ and there is at least one finite positive d (k). (Otherwise, the solution is to be handled by Lemma 2.) Therefore, d(N) is always finite. By putting $d(0)=\infty$, $G^{-1}(0)<d(0)$ and $G^{-1}(N)>d(N)$. Therefore, $G^{-1}(k)=d(k)$ for some $k=1, 2, \ldots, N-1$, or there is no k s.t. $G^{-1}(k)=d(k)$ and $G^{-1}(k)<d(k)$ for $k=0, 1, \ldots, K$ and $G^{-1}(k)>d(k)$ for $k=K+1, \ldots, N$, where $K=0, 1, \ldots, N-1$. The former is denoted as case 1 as discussed above. The latter is further classified into case 2 and case 3 based on whether or not $G^{-1}(K)<d(K+1)$. Therefore, any differentiation factor distribution $\{d(k), k=1, 2, \ldots, N\}$ falls into one of the following three cases.
Case 1
$\exists K \epsilon \{1, \ldots, N-1\}$ s.t.

$$d(K) = G^{-1}(K) \qquad (82)$$

Case 2
$\exists K \epsilon \{0, \ldots, N-1\}$ s.t.

$$G^{-1}(K) < d(K) \text{ and } G^{-1}(K+1) > d(K+1) \qquad (83)$$

and in addition $$G^{-1}(K) < d(K+1) \qquad (84)$$

Or equivalently,
$\exists K \epsilon \{0, \ldots, N-1\}$ s.t.

$$G(d(K+1)) - 1 < K < G(d(K+1)) \qquad (85)$$

Case 3
$\exists K \epsilon \{0, \ldots, N-1\}$ s.t.

$$G^{-1}(K) < d(K) \text{ and } G^{-1}(K+1) > d(K+1) \qquad (86)$$

and in addition $$G^{-1}(K) \geq d(K+1) \qquad (87)$$

Or, equivalently $$\exists K \in \{0, \ldots, N-1\} \text{ s.t.}$$

$$G(d(K+1)) \leq K < G(d(K)) \quad (88)$$

In the subsequent sections, we derive the proportional fair resource allocation for each of the cases.

Case 1

First we prove the following lemma.

Lemma 8

Let (71) and (72) be the solution to the maximization problem of (1) through (8). If the differentiation factor distribution $\{d(k), k=1, 2, \ldots, N\}$ falls into Case 1 with $G^{-1}(K)=d(K)$ for $K \in \{1, 2, \ldots, N-1\}$, then $$\lambda_1 = K \quad (89)$$

We prove it by contradiction. First, assume $K < \lambda_1$. Because $G^{-1}(x)$ is strictly increasing, $$G^{-1}(K) < G^{-1}(\lambda_1) \quad (90)$$

Since $G^{-1}(K) = d(K)$ from the definition of K $$d(K) < G^{-1}(\lambda_1) \quad (91)$$

Then by lemma 6

$$n_2 \leq K \leq N \quad (92)$$

By the assumption and (92)

$$n_2 \leq K < \lambda_1 \quad (93)$$

However, by lemma 4

$$n_2 \geq \lambda_1 + 1 \quad (94)$$

This contradicts with (93). Therefore, $$\lambda_1 \leq K \quad (95)$$

Now, assume $K > \lambda_1$. Because $G^{-1}(x)$ is strictly increasing, $$G^{-1}(K) > G^{-1}(\lambda_1) \quad (96)$$

From definition of K and (96)

$$d(K) > G^{-1}(\lambda_1) \quad (97)$$

Then by lemma 5

$$1 \leq K \leq n_1 \quad (98)$$

By the assumption and (98)

$$\lambda_1 < K \leq n_1 \quad (99)$$

However, by lemma 4

$$n_1 \leq \lambda_1 \quad (100)$$

This contradicts to (93). Therefore, $$K \leq \lambda_1 \quad (101)$$

The lemma follows from (95) and (101).

Now we derive a non-overlapping scheme as the solution to the maximization problem of (1) through (8) for case 1, and then show that an overlapping scheme with $n_2 = n_1 + 2$ does not exist for case 1.

Non-Overlapping Scheme

For a non-overlapping scheme, the equality in (75) and (76) is $$n_1 = \lambda_1 \quad (102)$$

$$n_2 = \lambda_1 + 1 \quad (103)$$

Because $n_1$ is an integer, from (89) and (102)

$$n_1 = \lambda_1 = K \quad (104)$$

and $$n_2 = K + 1 \quad (105)$$

Plugging (104) and (105) into (72) results in a non-overlapping resource allocation scheme as follows:

$$\begin{cases} b_1(k) = \dfrac{1}{K}, b_2(k) = 0 & \text{if } k = 1, \ldots, K \\ b_1(k) = 0, b_2(k) = \dfrac{1}{N-K} & \text{if } k = K+1, \ldots, N \end{cases} \quad (106)$$

where $K \in \{1, \ldots, N-1\}$, and $$d(K) = G^{-1}(K) \quad (107)$$

Overlapping Scheme

We show that an overlapping scheme with $n_2 = n_1 + 2$ does not exist for case 1. We prove this by contradiction. Assume there is an overlapping scheme with $n_2 = n_1 + 2$ for Case 1. For overlapping scheme, the equality does not hold in lemma 4. Thus $$n_1 < \lambda_1 < n_1 + 1 \quad (108)$$

However, from (89) $\lambda_1$ is an integer, and no integer satisfies (108). Due to the contradiction, we conclude that an overlapping scheme with $n_2 = n_1 + 2$ does not exist for case 1.

Case 2 will now be considered as follows:

Case 2

Derivation of case 2 uses the following lemma.

Lemma 9

Let (71) and (72) be the solution to the maximization problem of (1) through (8). If the differentiation factor distribution $\{d(k), k=1, 2, \ldots, N\}$ falls into case 2 with $G(d(K+1))-1 < K < G(d(K+1))$ for $K \in \{0, \ldots, N-1\}$, then $$\lambda_1 = G(d(K+1)) \quad (109)$$

We prove (109) by the similar technique used in the proof of lemma 8. First, assume $G(d(K+1)) < \lambda_1$. Because $K < G(d(K+1))$ from the definition of K $$K < \lambda_1 \quad (110)$$

Then by lemma 4, $$K < \lambda_1 \leq n_2 - 1 \quad (111)$$

and $$K + 1 < n_2 \quad (112)$$

However, because $G(d(K+1)) < \lambda_1$ from lemma 6

$$n_2 \leq K + 1 \quad (113)$$

But (113) contradicts with (112). Therefore, $$G(d(K+1)) \geq \lambda_1 \quad (114)$$

So, now assume $G(d(K+1)) > \lambda_1$. Since $G(d(K+1)) < K+1$ from definition of K $$\lambda_1 < K + 1 \quad (115)$$

Then by lemma 4, $$n_1 \leq \lambda_1 < K + 1 \quad (116)$$

and $$n_1 < K + 1 \quad (117)$$

However, because $G(d(K+1)) > \lambda_1$, from lemma 5

$$K + 1 \leq n_1 \quad (118)$$

But (118) contradicts with (117). Therefore, $$G(d(K+1)) \leq \lambda_1 \quad (119)$$

The lemma thus follows from (114) and (119).

In the following, we show that a non-overlapping scheme does not exist for case 2 and then drive an overlapping scheme with $n_2=n_1+2$ as the solution to the maximization problem of (1) through (8) for case 2.

Non-Overlapping Scheme

Assume there is a non-overlapping scheme that is the solution to the maximization problem of (1) through (8), then equality holds in lemma 4:

$$n_1=\lambda_1 \quad (120)$$

From (109)

$$n_1=\lambda_1=G(d(K+1)) \quad (121)$$

On the other hand, by the definition of K, $$K<G(d(K+1))<K+1 \quad (122)$$

Because $n_1$ is an integer, $G(d(K+1))$ should be an integer due to (121). However, from (122), $G(d(K+1))$ cannot be an integer. Hence, there is a contradiction that proves that a non-overlapping scheme does not exist for case 2.

Overlapping Scheme

In this subsection, we derive an overlapping scheme with $n_2=n_1+2$ for case 2. By lemma 4, $$n_1<\lambda_1<n_1+1 \quad (123)$$

From (109) and the definition of K, $$K<G(d(K+1))=\lambda_1<K+1 \quad (124)$$

Because $n_1$ and K are integers, from (123) and (124)

$$n_1=K \quad (125)$$

Because $n_2=n_1+2$ $$n_2=K+2 \quad (126)$$

From (3), (72), and (125)

$$1-\sum_{i=1}^{N}b_1(i)=\sum_{i=1}^{n_1+1}b_1(i)=\sum_{i=1}^{K+1}b_1(i)=\frac{K}{\lambda_1}+b_1(K+1) \quad (127)$$

From (127) and (109)

$$b_1(K+1)=1-\frac{K}{\lambda_1}=\frac{\lambda_1-K}{\lambda_1}=\frac{G(d(K+1))-K}{\lambda_1} \quad (128)$$

By (62) and (128)

$$b_2(K+1)=\frac{1-\lambda_1 \cdot b_1(K+1)}{\lambda_2}=\frac{1-G(d(K+1))-K}{\lambda_2} \quad (129)$$

Now, from (72), (128), and (129) we have an overlapping resource allocation scheme as follows:

$$\begin{cases} b_1(k)=\frac{1}{\lambda_1}, b_2(k)=0 & \text{if } k=1,\ldots,K \\ b_1(k)=\frac{a(k)}{\lambda_1}, b_2(k)=\frac{1-a(k)}{\lambda_2} & \text{if } k=K+1 \\ b_1(k)=0, b_2(k)=\frac{1}{\lambda_2} & \text{if } k=K+2,\ldots,N \end{cases} \quad (130)$$

where $K\in\{0,\ldots,N-1\}$, and $$K<G(d(K+1))<K+1 \quad (131)=$$

$$\lambda_1=G(d(K+1)) \quad (132)$$

$$\lambda_2=N-\lambda_1 \quad (133)$$

$$a(K+1)=G(d(K+1))-K \quad (134)$$

Finally, case 3 will be addressed as follows:

Case 3

Case 3 relies on the following lemma:

Lemma 10

Let (71) and (72) be the solution to the maximization problem of (1) through (8). If the differentiation factor distribution $\{d(k), k=1, 2, \ldots, N\}$ falls into case 3 with $G(d(K+1))\leq K<G(d(K))$ for $K\in\{0,\ldots,N-1\}$, then $$\lambda_1 K \quad (135)$$

A proof of (135) begins by assuming $K<\lambda_1$. Because $G^{-1}(x)$ is strictly increasing, $$G^{-1}(K)<G^{-1}(\lambda_1) \quad (136)$$

Since $G(d(K+1))$ K from the definition of K $$d(K+1)\leq G^{-1}(K)<G^{-1}(\lambda_1) \quad (137)$$

Then by lemma 6

$$n_2\leq K+1\leq N \quad (138)$$

By the assumption and (138)

$$n_2\leq K+1<\lambda_1+1 \quad (139)$$

However, by lemma 4

$$n_2\geq\lambda_1+1 \quad (140)$$

This contradicts with (139). Therefore, $$\lambda_1\leq K \quad (141)$$

Now, assume $K>\lambda_1$. Because $G^{-1}(x)$ is strictly increasing, $$G^{-1}(K)>G^{-1}(\lambda_1) \quad (142)$$

From definition of K and (142)

$$d(K)>G^{-1}(\lambda_1) \quad (143)$$

Then by lemma 5

$$1\leq K\leq n_1 \quad (144)$$

By the assumption and (144)

$$\lambda_1<K\leq n_1 \quad (145)$$

However, by lemma 4

$$n_1\leq\lambda_1 \quad (146)$$

This contradicts with (145). Therefore, $$K\leq\lambda_1 \quad (147)$$

The lemma follows from (141) and (147)

Now we derive a non-overlapping scheme as the solution to the maximization problem of (1) through (8) for case 3, and then show that overlapping scheme with $n_2=n_1+2$ does not exist for case 3.

Non-Overlapping Scheme

For a non-overlapping scheme, the equality holds in lemma 4:

$$n_1=\lambda_1 \quad (148)$$

$$n_2=\lambda_1+1 \quad (149)$$

Because $n_1$ is an integer, from (135) and $$n_1 = \lambda_1 = K \tag{150}$$

and $$n_2 = K+1 \tag{151}$$

Plugging (150) and (151) into (72) results in a non-overlapping resource allocation scheme as follows:

$$\begin{cases} b_1(k) = \frac{1}{K}, b_2(k) = 0 & \text{if } k = 1, \ldots, K \\ b_1(k) = 0, b_2(k) = \frac{1}{N-K} & \text{if } k = K+1, \ldots, N \end{cases} \tag{152}$$

where $K \in \{1, \ldots, N-1\}$, and $$G(d(K+1)) \leq K < G(d(K)) \tag{153}$$

Overlapping Scheme

We show that an overlapping scheme with $n_2 = n_1 + 2$ does not exist for case 3 by contradiction. Assume there is an overlapping scheme with $n_2 = n_1 + 2$ for case 3. For an overlapping scheme, the equality does not hold in lemma 4. Thus $$n_1 < \lambda_1 < n_1 + 1 \tag{154}$$

From (135) $\lambda_1$ must be an integer. But no integer satisfies (1534). Due to the resulting contradiction, we conclude that an overlapping scheme with $n_2 = n_1 + 2$ does not exist for case 3.

Regardless of whether an overlapping or non-overlapping scheme is implemented, the resulting scheme is required to operate in any of the three cases: case 1 to 3. As shown in the previous sections, however, neither the non-overlapping nor the overlapping scheme is capable of meeting that requirement. So, adaptive switching between the two schemes is necessary for implementation.

The following discussion proves the single form of the solution to the maximization problem of (1) through (8) discussed with regard to FIG. 8. Specifically $$\begin{cases} b_1(k) = \frac{1}{\lambda_1}, b_2(k) = 0 & \text{if } k = 1, \ldots, K \\ b_1(k) = \frac{a(k)}{\lambda_1}, b_2(k) = \frac{1-a(k)}{\lambda_2} & \text{if } k = K+1 \\ b_1(k) = 0, b_2(k) = \frac{1}{\lambda_2} & \text{if } k = K+2, \ldots, N \end{cases} \tag{155}$$

where $K \in \{0, 1, \ldots, N-1\}$, such that $$G(d(K+0)) - 1 \leq K < G(d(K)) \tag{156}$$

and $$\lambda_1 = \max(G(d(K+1)), K) \tag{157}$$

$$\lambda_2 = N - \lambda_1 \tag{158}$$

$$\alpha(K+1) = \max(G(d(K+0)) - K, 0) \tag{159}$$

Case 1

First, note that Case 1 is equivalent to the case where the equality in the LHS of (156) holds. That is, for a $K \in \{0, \ldots, N-1\}$, $$G(d(K+1)) = K+1 \tag{160}$$

Plugging (160) into (157) and (159) leads to $$\lambda_1 = K+1 \tag{161}$$

$$\alpha(K+1) = 1 \tag{162}$$

From (155), (161), (158), and (162):

$$\begin{cases} b_1(k) = \frac{1}{K+1}, b_2(k) = 0 & \text{if } k = 1, \ldots, K+1 \\ b_1(k) = 0, b_2(k) = \frac{1}{N-(K+1)} & \text{if } k = K+2, \ldots, N \end{cases} \tag{163}$$

Then (106) and (107) follows from (160) and (163) by putting $\hat{K} = K+1$. Thus, (155) through (159) correctly represent the non-overlapping solution to the maximization problem of (1) through (8) for case 1.

Case 2

Case 2 is the case where (84) and the inequalities of (156) hold. Because $G^{-1}(K) < d(K+1)$ by (84), and from (157) and (159)

$$\lambda_1 = \max(G(d(K+1)), K) = G(d(K+1)) \tag{164}$$

$$\alpha(K+1) = \max(G(d(K+1)) - K, 0) = G(d(K+1)) - K \tag{165}$$

(164) and (165) are respectively the same as (132) and (134). Thus, (155) through (159) correctly represent the overlapping scheme solution to the maximization problem of (1) through (8) for case 2.

Case 3

Case 3 is the case where (87) and the inequalities of (156) hold. Because $G^{-1}(K) \geq d(K+1)$ by (87) and from (157) and (159)=

$$\lambda_1 = K \tag{166}$$

$$\alpha(K+1) = 0 \tag{167}$$

(152) results from plugging (166) and (167) into (155). Thus, (155) through (159) correctly represent the non-overlapping solution to the maximization problem of (1) through (8) for case 3.

As discussed above with regard to FIG. 9, an alternative solution to (155) through (159) is given by $$\begin{cases} b_1(k) = \frac{1}{\lambda}, b_2(k) = 0 & \text{if } k = 1, \ldots, \lfloor \lambda \rfloor \\ b_1(k) = \frac{\lambda - \lfloor \lambda \rfloor}{\lambda}, b_2(k) = \frac{1 + \lfloor \lambda \rfloor - \lambda}{N - \lambda} & \text{if } k = \lfloor \lambda \rfloor + 1 \\ b_1(k) = 0, b_2(k) = \frac{1}{N - \lambda} & \text{if } k = \lfloor \lambda \rfloor + 2, \ldots, N \end{cases} \tag{168}$$

where $\lfloor x \rfloor$ is a flooring function, which returns the largest integer no greater than x, and $$\lambda = \max(G(d(K+1)), K) \tag{169}$$

and $K \in \{0, 1, \ldots, N-1\}$, such that $$G(d(K+1)) - 1 \leq K < G(d(K)) \tag{170}$$

Showing the equivalence of two representations is straightforward from $$\lfloor \lambda \rfloor = \begin{cases} K & \text{if } G(d(K+1)) - 1 < K < G(d(K)) \\ K+1 & \text{if } G(d(K+1)) = K+1 \end{cases} \tag{171}$$

Algorithms 2 through 4 will now be discussed in a more summary fashion in that the mathematical analysis to show their proportional fairness is analogous to that discussed above for algorithm 1. Algorithm 3 will be discussed first. Algorithm 3 is simply a more general form of algorithm 1 discussed above in that the indexing of the sorted differentiation factors starts from an arbitrary integer a as opposed to 1 in the case of algorithm 1. Such a re-indexing of the sorted differentiation factors is advantageous in that software solutions will require less memory for the implementation of algorithm 3.

Algorithm 3 also sorts the differentiation factors in a monotonically descending order but indexed from $k=\alpha, \alpha+1, \ldots, \alpha+N-1$. Such an indexing also covers N terminals as discussed with regard to algorithm 1 but does not start from 1 but instead from an arbitrary integer a, which can be positive or negative. The border terminal is then defined with regard to an index $K \in \{a-1, a, \ldots, a+N-2\}$ such that $G(d(K+1))-1 \leq K < G(d(K))$, where the border determining function $G(x)$ equals $(a-1+(N+a-1)x)/(1+x)$. It can be seen that such a border definition is analogous to act 805 of FIG. 8. Similarly, the first resource group share $b_1(k)$ and the second resource group share $b_2(k)$ can be defined analogously to step 810 as follows: if k is a member of the set $\{a, a+1, \ldots, K\}$ then $b_1(k)=1/\lambda_1$ and $b_2(k)=0$. On the other hand, if k equals K+1, then the resource group shares are given by $b_1(k)=\alpha/\lambda_1$ and $b_2(k)=(1-\alpha)/\lambda_2$. Finally, if k is a member of the set $\{K+2, \ldots, a+N-1\}$, then the resource group shares are given by $b_1(k)=0$ and $b_2(k)=1/\lambda_2$, where $\lambda_1$ equals the maximum of $(G(d(K+1)),K)-a+1$, $\lambda_2$ equals $N-\lambda_1$, and $\alpha$ equals $\lambda_1-K+a-1$, which in turn equals the $\max(G(d(K+1))-K,0)$. An alternative expression for algorithm 3 may be derived analogously as discussed with regard to FIG. 9 and also FIGS. 10 and 11.

In contrast to algorithm 1, algorithm 2 sorts the differentiation factors in a monotonically increasing order as indexed from k equals 1 to N. The border terminal is then defined with regard to an index $K \in \{2, 3, \ldots, N+1\}$ such that $G(d(K)) < K \leq G(d(K-1))+1$, where the border determining function $G(x)$ equals $(N+1+x)/(1+x)$. This border definition is also analogous to step 805 of FIG. 8. Similarly, the first resource group share $b_1(k)$ and the second resource group share $b_2(k)$ can be defiled analogously to step 810 as follows: If k belongs to the set $\{1, \ldots, K-2\}$, then $b_1(k)=0$ and $b_2(k)=1/\lambda_2$. On the other hand, if k equals K-1, then $b_1(k)=\alpha/\lambda_1$ and $b_2(k)=(1-\alpha)/\lambda_2$. Finally, if k is a member of the set $\{K, \ldots, N\}$, then $b_1(k)=1/\lambda_1$ and $b_2(k)=0$, where $\lambda_2$ equals the $\min(G(d(K-1)),K)-1$, $\lambda_1$ equals $N-\lambda_2$, and $\alpha$ equals $(K-1-\lambda_2)$, which in turn equals $\max(K-G(d(K-1)),0)$. An alternative expression for algorithm 2 may be derived analogously as discussed with regard to FIG. 9 and also FIGS. 10 and 11.

Algorithm 4 is the general case of algorithm 1 where the sorted differentiation factors are indexed from a to a+N−1 as in algorithm 3. The border terminal is then defined with regard to an index $K \in \{a+1, a+2, \ldots, a+N\}$ such that $G(d(K)) < K \leq G(d(K-1))+1$, where the border determining function $G(x)$ equals $(N+a+ax)/(1+x)$. Again, this border definition is analogous to step 805 of FIG. 8. Similarly, the first resource group share $b_1(k)$ and the second resource group share $b_2(k)$ can be defined analogously to step 810 as follows: If k belongs to the set $\{a, a+1, \ldots, K-2\}$, then $b_1(k)=0$ and $b_2(k)=1/\lambda_2$. On the other hand, if k equals K−1, then the resource group shares are given by $b_1(k)=\alpha/\lambda_1$ and $b_2(k)=(1-\alpha)/\lambda_2$. Finally, if k is a member of the set $\{K, \ldots, a+N-1\}$, then the resource group shares are given by $b_1(k)=1/\lambda_1$ and $b_2(k)=0$, where $\lambda_2$ equals $\min(G(d(K-1)),K)-a$, $\lambda_1$ equals $N-\lambda_2$, and a equals $K-a-\lambda_2$, which in turn equals $\max(K-G(d(K-1)),0)$.

Regardless of which algorithm is implemented, the allocation of resource groups may be applied in either the uplink or the downlink. A base station may measure the uplink data rates directly. However, the downlink data rates are preferably determined by the terminals. Thus step 1200 of FIG. 12 discussed further below may not be necessary for the uplink but is preferably used in the downlink.

Figure 12:
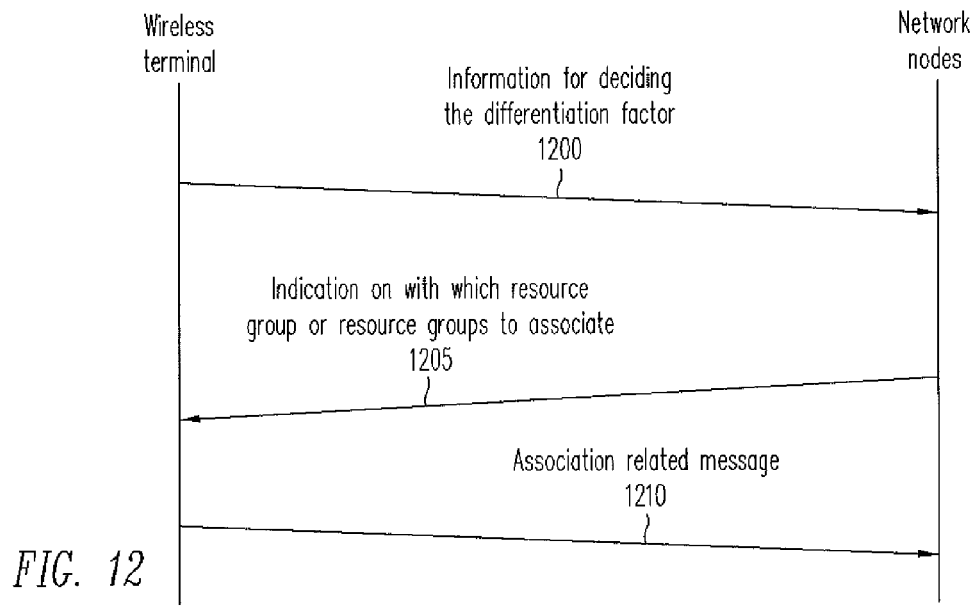
FIG. 12 illustrates the signal flow between a base station and a mobile station to enable the measurement of downlink data rates in conjunction with a proportional fair resource allocation.

The overhead required for downlink allocation is illustrated in FIG. 12. Terminals determine their downlink rates and deliver the information for deriving the differentiation factors in a step 1200. In that regard, each terminal may measure the downlink rates and determine its differentiation factor so that it may transmit the differentiation factor directly to the base station in step 1200. Alternatively, the terminals may simply transmit the rates in step 1200 such that the base station determines the differentiation factors. The base station may transmit an indication 1205 to the terminals to indicate what resource group or groups each terminal should associate with. The terminals may then confirm their corresponding association (or associations) in a step 1210.

Association is yet another example which may require the collaboration of terminals and network nodes. Association may require terminals to transmit a certain message to the network based on the knowledge of which resource group or groups the terminals are to be associated. For example, in a carrier aggregation scenario, the CC or CCs to be activated is determined by the network and delivered to the terminals. The terminals then transmit a CC activation message to the network to complete the association. In a resource partition scenario, the network determines on which resource partition or partitions a terminal should monitor and delivers the decision to the terminals. The terminals, in response to this association indication, monitor the corresponding resource partition(s) and send a measurement report on the resource partitions to the network. In a handoff scenario, the network decides which cell for a terminal to handoff. In return, the terminals, transmit handoff related messages to the network.

Figure 13:
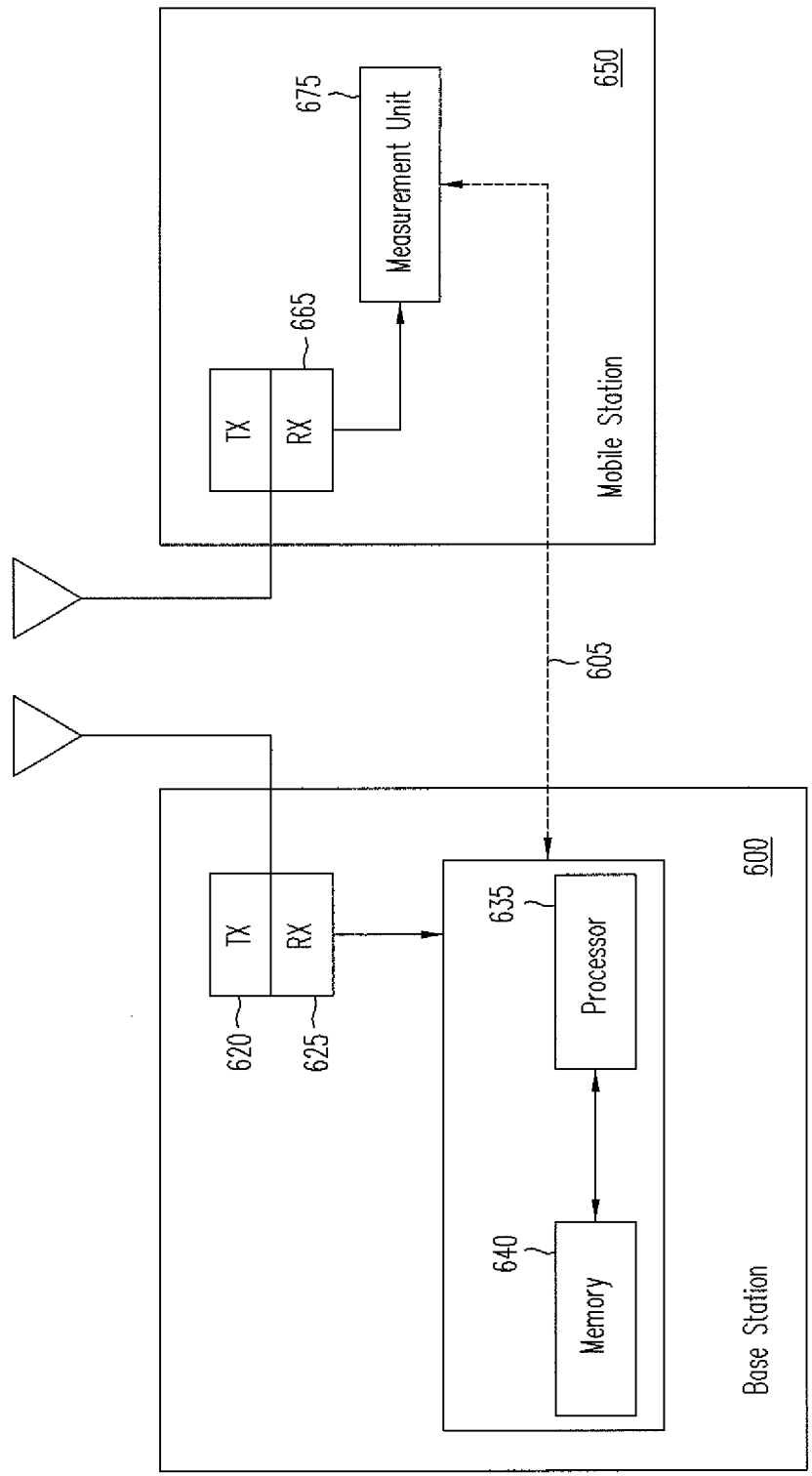
FIG. 13 is a block diagram of the base station and mobile station of FIG. 12.

FIG. 13 shows a base station 600 and a mobile station 650 configured to perform the downlink allocation discussed with regard to FIG. 12. A transmit/receive module 665 in mobile station 650 couples to a measurement unit 675 so that the downlink data rates for each resource group can be measured. The resulting rates are transmitted to base station 600 as shown symbolically as path 605. Base station 600 includes a processor 635 that determines the proportional fair downlink allocations according to one of algorithms 1 through 4 discussed above. The resulting allocations may be stored in a memory 640 and also communicated back to mobile station 650 over symbolic path 605. Mobile station 650 may then proceed to receive downlink transmissions from base station 605 as generated in a transmit/receive module 620 according to its calculated resource allocation share.

The above-described embodiments of the present invention are representative of many possible embodiments. It will thus be apparent to those skilled in the art that various changes and modifications may be made to what has been disclosed without departing from this invention. The appended claims encompass all such changes and modifications as falling within the true spirit and scope of this invention.

What is claimed is:

1. A method of associating a plurality of mobile stations between a first resource group and a second resource group, comprising:

for each mobile station, determining a first unit share rate for the mobile station for a first one of the resource groups and a second unit share rate for the mobile station for a remaining second one of the resource groups;

for each mobile station, determining a corresponding differentiation factor from the mobile station's first unit share rate and the mobile station's second unit share rate;

sorting the differentiation factors into one of a monotonically ascending order or a monotonically descending order to produce sorted differentiation factors;

applying a proportional fair border determining function to the sorted differentiation factors to determine a border one of the sorted differentiation factors, wherein a first portion of the sorted differentiation factors includes the border differentiation factor and any differentiation factors that are less than or equal to the border differentiation factor and a second portion includes the border differentiation factor and any differentiation factors that are greater than or equal to the border differentiation factor, and associating the mobile stations corresponding to the first portion with the first resource group and associating the mobile stations corresponding to the second portion with the second resource group.

2. The method of claim 1, wherein each differentiation factor depends upon a relative size of the first resource group as compared to a relative size of the second resource group.

3. The method of claim 1, wherein the first and second resource groups are selected from the group consisting of time domain resource partitions and frequency domain resource partitions.

4. The method of claim 1, wherein the association is a downlink association, the method further comprising:

from a base station, transmitting downlink symbols to the mobile stations according to the association.

5. The method of claim 4, wherein each mobile station determines its first and second unit share rates, the method further comprising:

from each mobile station, transmitting the first and second unit data rates to the base station.

6. The method of claim 4, wherein each mobile station determines its first and second unit share rates and also its differentiation factor, the method further comprising:

from each mobile station, transmitting its differentiation factor to the base station.

7. The method of claim 1, wherein the sorting is a monotonically decreasing order, and wherein the plurality equals an integer number N, and wherein the proportional fair border determining function for each sorted differentiation factor equals N times the sorted differentiation factor divided by a sum of one plus the sorted differentiation factor.

8. The method of claim 1, further comprising: allocating the first resource group to the mobile stations corresponding to the first portion and allocating the second resource group to the mobile stations corresponding to the second portion.

9. A base station, comprising:

a processor configured to sort a plurality of differentiation factors corresponding to a plurality of mobile stations, wherein each differentiation factor is a ratio of a first unit share rate for the corresponding mobile station using a first resource group to a second unit share rate for the corresponding mobile station using a second resource group, the processor being configured to sort the differentiation factors into one of a monotonically ascending order or a monotonically descending order to produce sorted differentiation factors and to apply a proportional fair border determining function to the sorted differentiation factors to determine a border one of the sorted differentiation factors, wherein a first portion of the sorted differentiation factors includes the border differentiation factor and any differentiation factors that are less than or equal to the border differentiation factor and a second portion includes the border differentiation factor and any differentiation factors that are greater than or equal to the border differentiation factor, and wherein the processor is further configured to associate the mobile stations corresponding to the first portion with the first resource group and to associate the mobile stations corresponding to the second portion with the second resource group; and a memory to store the resource group associations.

10. The base station of claim 9, further comprising: a receive/transmit module configured to transmit downlink transmissions to the mobile stations according to the resource group associations.

11. The base station of claim 10, wherein the receive/transmit module is further configured to receive the first and second unit share rates from each mobile station, and wherein the processor is configured to determine the differentiation factors from the received first and second unit data rates.

12. The base station of claim 10, wherein the receive/transmit module is further configured to receive the differentiation factors from the plurality of mobile stations.

13. The base station of claim 10, wherein the processor is further configured to sort the differentiation factors into monotonically ascending order.

14. The base station of claim 10, wherein the processor is further configured to allocate the first resource group among the mobile stations corresponding to the first portion and to allocate the second resource group among the mobile stations corresponding to the second portion.

* * * * *